(12) United States Patent
Okuda

(10) Patent No.: US 11,267,982 B2
(45) Date of Patent: Mar. 8, 2022

(54) RECORDING METHOD, INK SET, AND RECORDING APPARATUS

(71) Applicant: Seiko Epson Corporation, Tokyo (JP)

(72) Inventor: Ippei Okuda, Shiojiri (JP)

(73) Assignee: Seiko Epson Corporation

( * ) Notice: Subject to any disclaimer, the term of this patent is extended or adjusted under 35 U.S.C. 154(b) by 243 days.

(21) Appl. No.: 16/354,288

(22) Filed: Mar. 15, 2019

(65) Prior Publication Data
US 2019/0284425 A1  Sep. 19, 2019

(30) Foreign Application Priority Data

Mar. 16, 2018 (JP) .............................. JP2018-049354

(51) Int. Cl.
| | |
|---|---|
| *B41J 2/21* | (2006.01) |
| *C09D 11/54* | (2014.01) |
| *C09D 11/322* | (2014.01) |
| *C09D 11/38* | (2014.01) |
| *C09D 11/40* | (2014.01) |
| *B41M 7/00* | (2006.01) |
| *B41M 5/00* | (2006.01) |
| *C09D 11/106* | (2014.01) |

(Continued)

(52) U.S. Cl.
CPC ............. *C09D 11/54* (2013.01); *B41J 2/2114* (2013.01); *B41M 5/0017* (2013.01); *B41M 7/0054* (2013.01); *C09D 11/102* (2013.01); *C09D 11/106* (2013.01); *C09D 11/322* (2013.01); *C09D 11/38* (2013.01); *C09D 11/40* (2013.01); *C09D 11/326* (2013.01)

(58) Field of Classification Search
CPC ..... C09D 11/54; C09D 11/106; C09D 11/102; C09D 11/322; C09D 11/38; C09D 11/40; C09D 11/326; C09D 11/30; C09D 11/36; B41M 7/0054; B41M 5/0017; B41J 2/2114; B41J 2/01; B41J 2/21
See application file for complete search history.

(56) References Cited

U.S. PATENT DOCUMENTS

| | | | |
|---|---|---|---|
| 8,873,103 | B2 | 10/2014 | Tsuchiya et al. |
| 2005/0062819 | A1 | 3/2005 | Ohya et al. |
| 2005/0200672 | A1 | 9/2005 | Ohya |

(Continued)

FOREIGN PATENT DOCUMENTS

| | | |
|---|---|---|
| EP | 1 759 858 A1 | 3/2007 |
| EP | 3 061 618 A1 | 8/2016 |

(Continued)

OTHER PUBLICATIONS

Extended European Search Report for Application No. EP 19 16 3292 dated Jul. 24, 2019 (7 pages).

*Primary Examiner* — Lamson D Nguyen
(74) *Attorney, Agent, or Firm* — Harness, Dickey & Pierce, P.L.C.

(57) ABSTRACT

A recording method includes: causing a processing solution that contains a coagulant for coagulating constituents of an ink composition to adhere to a recording medium; causing an ink composition that includes a light ink composition and a dark ink composition that belong to a same color system and have mutually different color densities to adhere to the recording medium; and causing a clear ink composition that includes resin to adhere to the recording medium.

32 Claims, 2 Drawing Sheets

(51) Int. Cl.
*C09D 11/102* (2014.01)
*C09D 11/326* (2014.01)

(56) References Cited

U.S. PATENT DOCUMENTS

| | | | |
|---|---|---|---|
| 2006/0023044 | A1 | 2/2006 | Bauer |
| 2007/0052785 | A1 | 3/2007 | Itoh et al. |
| 2011/0001775 | A1 | 1/2011 | Nishiwaki et al. |
| 2011/0242200 | A1* | 10/2011 | Tojo ................. B41M 7/009 347/21 |
| 2017/0166767 | A1 | 6/2017 | Watanabe et al. |

FOREIGN PATENT DOCUMENTS

| | | |
|---|---|---|
| JP | 2004-107427 A | 4/2004 |
| JP | 2005-247915 A | 9/2005 |
| JP | 2005-262775 A | 9/2005 |
| JP | 2006-272934 A | 10/2006 |
| JP | 2007-062311 A | 3/2007 |
| JP | 2008-508120 A | 3/2008 |
| JP | 2011-110755 A | 6/2011 |
| JP | 2015-209535 A | 11/2015 |
| JP | 2016-145312 A | 8/2016 |
| JP | 2017-110182 A | 6/2017 |
| WO | 2005/084954 A1 | 9/2005 |

\* cited by examiner

RECORDING METHOD, INK SET, AND RECORDING APPARATUS

BACKGROUND

1. Technical Field

The present invention relates to a recording method, an ink set, and a recording apparatus.

2. Related Art

An ink jet recording method of causing nozzles of an ejection head of an ink jet recording apparatus to eject minute ink droplets and recording an image on a recording medium is known. In recent years, the ink jet recording method has been used not only for recording an image on a recording medium with excellent ink absorbability such as an ordinary paper but also recording an image on a low-absorbable recording medium with low ink absorbability such as an art paper or a coated paper, for example, or on a non-absorbable recording medium that hardly absorbs ink, such as a plastic film, for example. In addition, a water-based ink jet ink composition (hereinafter, also referred to as "water-based ink" or "ink") that contains water as a base has also been used for recording an image on such a low-absorbable recording medium or a non-absorbable recording medium.

For performing recording using a water-based ink jet ink composition, there is a technology of using ink that contains constituents with reactivity such as resin and a processing solution for coagulating constituents of the ink in combination in order to obtain an image with excellent abrasion resistance and image quality, and the processing solution is often used for performing recording on a low-absorbable recording medium or a non-absorbable recording medium, in particular (see JP-A-2017-110182, for example).

SUMMARY

An advantage of some aspects of the invention is to provide a recording method that uses such a processing solution and achieve excellent abrasion resistance and image quality in a case in which a light ink composition that includes a small content of coloring material is used along with a dark ink composition to perform recording.

APPLICATION EXAMPLE 1

According to an aspect of the invention, there is provided a recording method including: causing a processing solution that contains a coagulant for coagulating constituents of an ink composition to adhere to a recording medium; causing an ink composition that includes a light ink composition and a dark ink composition that belong to a same color system and have mutually different color densities to adhere to the recording medium; and causing a clear ink composition that includes resin to adhere to the recording medium.

APPLICATION EXAMPLE 2

In Application Example 1, a content of the resin included in the clear ink composition may be equal to or greater than 3% by mass.

APPLICATION EXAMPLE 3

In Application Example 1 or 2, one or more kinds of any of cationic resin, organic acids, and polyvalent metal salts may be included as the coagulant included in the processing solution.

APPLICATION EXAMPLE 4

In any one of Application Examples 1 to 3, the light ink composition may include a nitrogen-containing solvent.

APPLICATION EXAMPLE 5

In any one of Application Examples 1 to 4, a region in which an amount of the adhering light ink composition is equal to or less than 6 mg/inch$^2$ may be included in a region, to which the processing solution, the light ink composition, and the clear ink composition are caused to adhere, on the recording medium, and a region in which an amount of the adhering dark ink composition may be greater than 6 mg/inch$^2$ may be included in a region, to which the processing solution and the dark ink composition are caused to adhere.

APPLICATION EXAMPLE 6

In any one of Application Examples 1 to 5, a region in which an amount of the adhering clear ink composition is equal to or greater than 1 mg/inch$^2$ may be included in a region, to which the processing solution, the light ink composition, and the clear ink composition are caused to adhere, on the recording medium.

APPLICATION EXAMPLE 7

In any one of Application Examples 1 to 6, a content of polyols with standard boiling points of equal to or greater than 280° C. in the light ink composition, the dark ink composition, and the clear ink composition may be equal to or less than 0.8% by mass with respect to the ink composition.

APPLICATION EXAMPLE 8

In any one of Application Examples 1 to 7, the light ink composition and the dark ink composition may respectively include resin, and the content of the resin included in the light ink composition and the dark ink composition may be equal to or greater than 2% by mass.

APPLICATION EXAMPLE 9

In any one of Application Examples 1 to 8, the clear ink composition may include the resin in a form of fine resin particles, and a volume average particle diameter before mixing a water dispersion of the fine resin particles with a 0.3M magnesium sulfate aqueous solution may be equal to or less than three times as large as a volume average particle diameter after the mixing.

APPLICATION EXAMPLE 10

In any one of Application Examples 1 to 9, the light ink composition, the dark ink composition, and the clear ink composition may be caused to be respectively ejected from the ink jet head and adhere to the recording medium.

APPLICATION EXAMPLE 11

In any one of Application Examples 1 to 10, the recording medium may be a low-absorbable recording medium or a non-absorbable recording medium.

APPLICATION EXAMPLE 12

According to an aspect of the invention, there is provided an ink set that is used in the recording method according to any one of Application Examples 1 to 11, the ink set including: the ink composition that includes the light ink composition and the dark ink composition; and the clear ink composition.

APPLICATION EXAMPLE 13

According to an aspect of the invention, there is provided a recording apparatus that performs recording by the recording method according to any one of Application Examples 1 to 11.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention (hereinafter, referred to as an "embodiment") will be described. The embodiment described below describes examples of the invention. In addition, the invention is not limited to the following embodiment, and various modification examples that are performed without changing the gist of the invention are also included therein.

According to an aspect of a recording method in the embodiment, a recording method includes: causing a processing solution that contains a coagulant for coagulating constituents of an ink composition to adhere to the recording medium; causing an ink composition that includes a light ink composition and a dark ink composition that belong to a same color system and have mutually different color densities to adhere to the recording medium; and causing a clear ink composition that includes resin to adhere to the recording medium.

According to an aspect of the embodiment, an ink set that is used in the recording method according to the embodiment includes: the ink composition that includes the light ink composition and the dark ink composition; and the clear ink composition.

Further, according to an aspect of the embodiment, a recording apparatus performs the recording method according to the embodiment.

Hereinafter, an example of a recording method, an ink set, and a recording apparatus according to the embodiment will be described in the order of a recording apparatus that performs a recording method, an ink composition (hereinafter, also referred to as "ink") that forms an ink set, a processing solution, a recording medium, and a recording method.

Note that in the specification, "duty" is a value calculated by Equation (1) below.

$$\text{Duty (\%)} = \{\text{number of actually printed dots}/(\text{vertical resolution} \times \text{horizontal resolution})\} \times 100 \quad (1)$$

(In the equation, the "number of actually printed dots" represents the number of actually printed dots per unit area, and "vertical resolution" and "horizontal resolution" are respectively resolution per unit area.)

1. RESPECTIVE CONFIGURATIONS 1.1. Recording Apparatus

An example of the recording apparatus that performs the recording method according to the embodiment will be described by exemplifying an ink jet recording apparatus. Note that the example of the recording apparatus that can be used for the recording method according to the embodiment is not limited to the ink jet recording apparatus.

Figure 1:
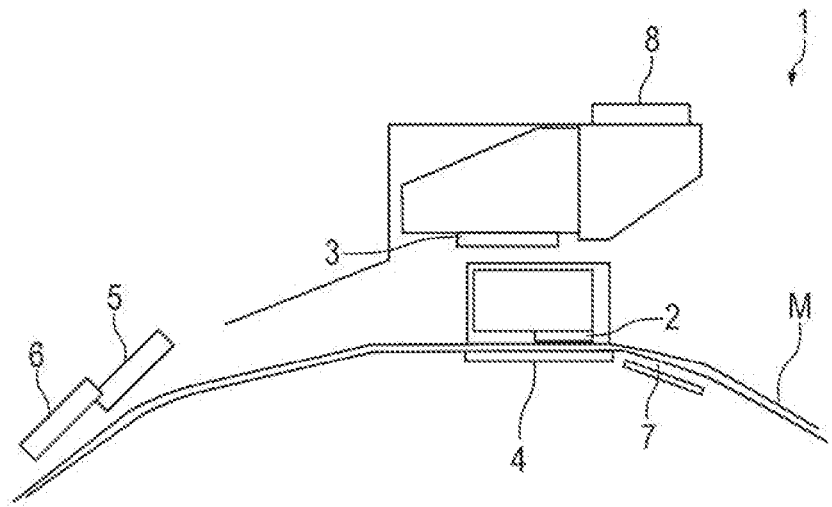
FIG. 1 is an outline sectional view schematically illustrating an ink jet recording apparatus.

An example of the ink jet recording apparatus used in the embodiment will be described with reference to drawings. FIG. 1 is an outline sectional view schematically illustrating the ink jet recording apparatus. As illustrated in FIG. 1, an ink jet recording apparatus 1 includes an ink jet head 2, an IR heater 3, a platen heater 4, a hardening heater 5, a cooling fan 6, a preheater 7, and a ventilation fan 8. The ink jet recording apparatus 1 includes a control unit, which is not illustrated in the drawing, and operations of the entire ink jet recording apparatus 1 are controlled by the control unit.

The ink jet head 2 is a mechanism that ejects an ink composition and a processing solution and causes the ink composition and the processing solution to adhere to a recording medium M.

The ink jet head 2 includes nozzles (not illustrated) that eject the ink composition and the processing solution. As a scheme of causing the nozzles to eject ink, a scheme of applying a strong electric field between the nozzles and an acceleration electrode placed in front of the nozzles, causing the nozzles to successively eject ink in the form of droplets, and causing the nozzle to eject the ink in accordance with recording information signals while the ink droplets fly between deflection electrodes (electrostatic suctioning scheme); a scheme of applying a pressure to the ink using a small pump, mechanically oscillating the nozzles with crystal oscillators or the like, thereby forcibly causing the nozzles to eject ink droplets; a scheme of simultaneously applying a pressure and recording information signals to the ink at the same time with a piezoelectric element and ejecting and recording ink droplets (piezoelectric scheme); and a scheme of heating and foaming the ink with a minute electrode in accordance with recording information signals and ejecting and recording ink droplets (thermal jet scheme), and the like are exemplified.

As the ink jet head 2, either a line-type ink jet head or a serial-type ink jet head can be used.

Here, an ink jet recording apparatus including a serial-type ink jet head is adapted to perform recording by performing scanning (pass) of causing an ink jet head for recording to eject ink composition a plurality of times while relatively moving the ink jet head for recording relative to a recording medium. Specific examples of the serial-type ink jet head include an ink jet head that is mounted on a carriage that moves in a width direction of the recording medium, that is, a direction that intersects a transport direction of the recording medium and that ejects liquid droplets onto the recording medium by the ink jet head moving with movement of the carriage. A recording method using the serial-type ink jet head is referred to as a serial-type recording method.

For example, the ink jet head 2 is mounted on a carriage, which is not illustrated in the drawing, in FIG. 1, and it is only necessary that scanning (main scanning) of ejecting the ink composition from the ink jet head and causing the ink composition to adhere to the recording medium (main scanning) be performed while the carriage moves in a closer side-further side direction (main scanning direction). Recording is performed by alternately repeating the main scanning and transporting of the recording medium (sub scanning).

Figure 2:
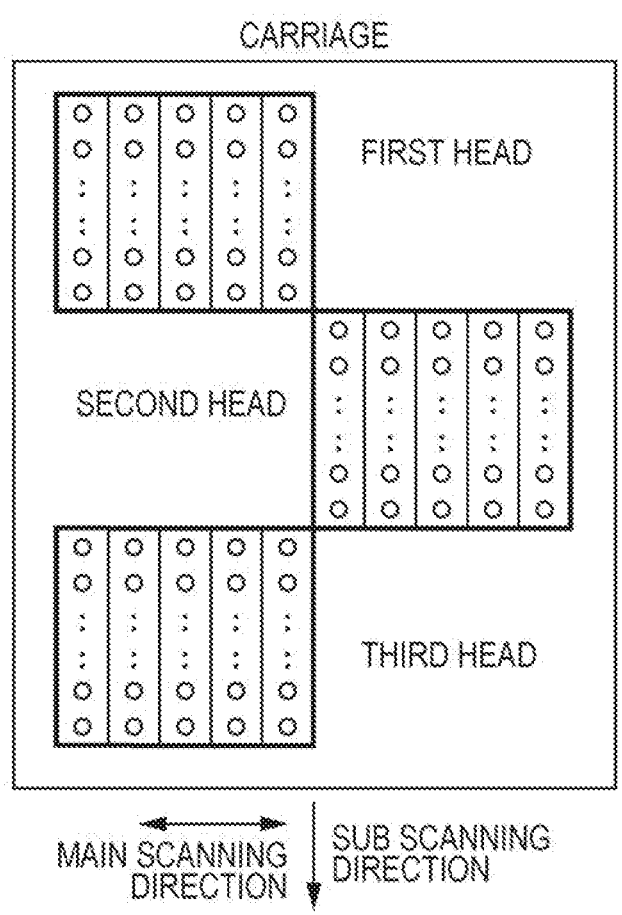
FIG. 2 is an outline upper view schematically illustrating an example of an ink jet head.

FIG. 2 is an upper view of an example of the serial ink jet head when viewed from the upper side relative to the recording medium. Three ink jet heads are provided at the carriage from an upstream side to a downstream side in a sub scanning direction that is a transport direction of the recording medium, and each ink jet head includes five nozzle arrays. The left-right direction in the drawing is a main scanning direction. The number of ink jet heads that the carriage has is not limited and may be equal to or greater than one. The number of nozzle arrays that the ink jet head has is not limited and may be equal to or greater than one.

Meanwhile, an ink jet recording apparatus including a line-type ink jet head performs recording by performing scanning (pass) of causing an ink jet head for recording to eject the ink composition once while relatively moving the ink jet head for recording relative to the recording medium. Specific examples of the line-type ink jet head include an ink jet head that is formed to have a width that is greater than the width of the recording medium and ejects liquid droplets onto the recording medium without causing the ink jet head for recording to move.

For example, the ink jet head 2 is a line head that has a length corresponding to the width of the recording medium in the close side-further side direction (width direction) in FIG. 1, and recording is performed by performing scanning of ejecting the ink composition from ink jet head and causing the ink composition to adhere to the recording medium while transporting the recording medium. The recording method using the line-type ink jet head is referred to as a line-type recording method.

In the embodiment, an ink jet recording apparatus including a serial-type ink jet head is used as the ink jet recording apparatus 1, and the ink jet head 2 using a piezoelectric scheme as a scheme of ejecting ink from the nozzles is used.

The ink jet recording apparatus 1 includes an IR heater 3 and a platen heater 4 for heating the recording medium M when the ink composition and the processing solution are ejected from the ink jet head 2, that is, for primary heating or primary drying. In the embodiment, at least one of the IR heater 3 and the platen heater 4 may be used when the recording medium M is heated in the process of causing the ink composition to adhere, which will be described later.

Note that if the IR heater 3 is used, it is possible to heat the recording medium M from the side of the ink jet head 2. Although the ink jet head 2 is also heated at the same time in this manner, it is possible to raise a temperature without being affected by the thickness of the recording medium M as compared with a case in which the recording medium M is heated from the rear surface with the platen heater 4 or the like. If the platen heater 4 is used when the recording medium M is heated, it is possible to heat the recording medium M from the side of the ink jet head 2 and the opposite side. In this manner, the ink jet head 2 relatively tends not to be heated.

An upper limit of a surface temperature of the recording medium M heated by the IR heater 3 and the platen heater 4 is preferably equal to or less than 45° C., is more preferably equal to or less than 40° C., is further preferably equal to or less than 38° C., and is particularly preferably equal to or less than 35° C. A lower limit of the surface temperature of the recording medium M is preferably equal to or greater than 25° C., is more preferably equal to or greater than 28° C., and is further preferably equal to or greater than 30° C., and is particularly preferably equal to or greater than 32° C. In this manner, since radiant heat received from the IR heater 3 and the platen heater 4 is reduced or eliminated, it is possible to prevent the ink composition in the ink jet head 2 from drying, to prevent the compositions from varying, and to prevent the ink and the resin from welding to the inner wall of the ink jet head 2. Also, it is possible to fix the ink early and to improve image quality.

The hardening heater 5 is a heater for drying or solidifying the ink composition that has adhered to the recording medium M, that is, for secondary heating or secondary drying. Moisture or the like included in the ink composition quickly evaporate and fly by the hardening heater 5 heating the recording medium M on which an image has been recorded, and an ink film s formed with the resin in the form of fine resin particles included in the ink composition. In this manner, the ink film is firmly fixed or bonded to the recording medium M, excellent film formation properties are achieved, and it is possible to obtain an image with excellent image quality in a short time. An upper limit of the surface temperature of the recording medium M heated with the hardening heater 5 is preferably equal to or less than 120° C., is more preferably equal to or less than 100° C., and is further preferably equal to or less than 90° C. A lower limit of the surface temperature of the recording medium M is preferably equal to or greater than 60° C., is more preferably equal to or greater than 70° C., and is further preferably equal to or greater than 80° C. If the temperature falls within the aforementioned range, it is possible to obtain an image with high image quality in a short time.

The ink jet recording apparatus 1 may have the cooling fan 6. It is possible to form an ink coated film with satisfactory adhesiveness on the recording medium M by cooling the ink composition on the recording medium M with the cooling fan 6 after the ink composition recorded on the recording medium M is dried.

The ink jet recording apparatus 1 may include the preheater 7 that preheats the recording medium M before the ink composition is caused to adhere to the recording medium M. Further, the recording apparatus 1 may include the ventilation fan 8 for more efficiently drying the ink composition and the processing solution adhering to the recording medium M.

1.2. Ink Set

Next, the ink set according to the embodiment will be described.

The ink set according to the embodiment includes an ink composition that includes a light ink composition and a dark ink composition that belong to the same color system and have mutually different color densities and a clear ink composition that includes resin, and the ink set is used for recording along with a processing solution that contains a coagulant for coagulating constituents of the ink composition.

In the ink set according to the embodiment, the light ink composition and the dark ink composition are color ink that includes coloring materials.

In the ink set according to the embodiment, the light ink composition and the dark ink composition are ink that mutually belong the same color system.

The ink that belongs to the "same color system" means at least any of the following ink.

(A) Ink that are considered to belong to the same color system from their ink names such as cyan ink and light cyan ink (also referred to as photo cyan ink), magenta ink and light magenta ink (also referred to as photo magenta ink), yellow ink and dark yellow ink, and black ink and gray ink.

(B) Light ink composition and dark ink composition with which images are recorded on a white recording medium such that a difference in hue angles $\angle H°$ is within 30°. Here, the hue angle $\angle H°$ is defined in a CIELAB color space and is obtained by $\angle H°=\tan^{-1}(b*/a*)+180$ (in the case of $a*<0$) or $\angle H°=\tan^{-2}(b*/a*)+360$ (in the case of $a*>0$). $a*$ and $b*$ represent chromaticness indexes defined in the CIELAB color space.

Here, images that are suitable for checking ink colors are recorded by recording the images with 10 mg/inch$^2$ of adhering ink, for example. Color measurement is performed by a color measurement device in accordance with CIELAB. The difference in the hue angles $\angle H°$ is preferably within 10° and is further preferably within 5°.

(C) Ink that contains coloring materials that belong to the same groups when the coloring materials are grouped into yellow coloring materials, cyan coloring materials, magenta coloring materials, black coloring materials, or the like. Preferably, ink that contains the same coloring material.

The dark ink and the light ink that belong to the same color system means at least any of the following ink.

(A) Ink that contains mutually different contents of coloring materials in terms of mass. Here, in the light ink composition and the dark ink composition, the ink composition that contains a larger content of coloring material is assumed to be the dark ink composition (hereinafter, also referred to as "dark ink"), and the ink composition that contains a smaller content of coloring material than the dark ink composition is assumed to be the light ink composition (hereinafter, also referred to as "light ink".

(B) Ink that exhibits different image densities when the amounts of adhering ink are set to be the same, images are recorded, and the colors are measured. This is determined on the basis of brightness $L*$. Here, image recording and color measurement are performed in the same manner as that described above. The ink composition that exhibits a higher image density is assumed to be the dark ink composition, and the ink composition that exhibits a lower image density is assumed to be the light ink composition.

The clear ink composition (hereinafter, also referred to as "clear ink") in the ink set according to the embodiment will be described later.

Note that the ink composition that forms the ink set according to the embodiment is preferably a water-based ink jet ink composition. Here, the "water-based" composition in the invention is a composition that contains water as one main solvent. The content of water in the composition is preferably equal to or greater than 40% by mass, is further preferably equal to or greater than 45% by mass, is more preferably equal to or greater than 50% by mass, and is particularly preferably equal to or greater than 60% by mass.

The ink jet ink composition is an ink composition that is used in the ink jet recording method.

Further, the ink composition that forms the ink set according to the embodiment may or may not include an organic solvent, and the content of the organic solvent in the composition is preferably equal to or less than 30% by mass, is more preferably equal to or less than 25% by mass, and is particularly preferably equal to or less than 20% by mass with respect to 100% by mass of the composition.

Hereinafter, constituents that are or can be included in the ink composition that forms the ink set according to the embodiment will be described separately for the color ink and for the clear ink.

1.2.1. Color Ink

The ink set according to the embodiment includes a light ink composition and a dark ink composition that belong to the same color system and have mutually different color densities. The light ink composition and the dark ink composition that belong to the same color system and have mutually different color densities can respectively independently have constituents, properties, and the like as will be described later other than that the light ink composition and the dark ink composition belong to the same color system and have mutually different color densities.

Coloring Materials

In the embodiment, the light ink composition and the dark ink composition include coloring materials. Although either dyes or pigments can be used, pigments are preferably used since the pigments have properties that colors tend not to fade due to light, gas, and the like. Images formed on recording media using the pigments have not only excellent image quality but also excellent water resistance, gas resistance, light resistance, and the like and satisfactory preservation properties. These properties significantly appear in a case in which the images are formed on ink low-absorbable or non-absorbable recording media, in particular. Note that in the embodiment, the light ink composition and the dark ink composition may include the same coloring material or different coloring materials, respectively.

Although pigments that can be used in the embodiment are not particularly restricted, examples thereof include inorganic pigments and organic pigments. As the inorganic pigments, titanium oxide, iron oxide, and carbon black manufactured by a known method such as a contact method, a furnace method, or a thermal method can be used. Meanwhile, as the organic pigments, it is possible to use an azo pigment, a polycyclic pigment, a nitro pigment, a nitroso pigment, aniline black, or the like, for example. Examples of the azo pigment include azo lake, an insoluble azo pigment, a condensed azo pigment, a chelate azo pigment, and the like. Examples of the polycyclic pigment include a phthalocyanine pigment, a perylene pigment, a perinone pigment, an anthraquinone pigment, a quinophthalone pigment, and the like.

From among the specific examples of the pigment that can be used in the embodiment, carbon black, for example, is exemplified as a pigment that can be used in black ink. Although carbon black is not particularly limited, examples thereof include furnace black, lamp black, acetylene black, or channel black (C.I. Pigment Black 7), and examples of commercially available products include No. 2300, 900, MCF88, No. 20B, No. 33, No. 40, No. 45, No. 52, MA7, MA8, MA77, MA100, No. 2200B and the like (all of which are names of products manufactured by Mitsubishi Chemical Corporation), Color Black FW1, FW2, FW2V, FW18, FW200, 5150, S160, and 5170, Pretex 35, U, V, and 140U, and Special Black 6, 5, 4A, 4, and 250 and the like (all of which are names of products manufactured by Degussa AG), Con ductex SC, and Raven 1255, 5750, 5250, 5000, 3500, 1255, and 700, and the like (all of which are names of products manufactured by Columbia Carbon), and Regal 400R, 330R, and 660R, Mogul L, and Monarch 700, 800, 880, 900, 1000, 1100, 1300, and 1400, Elftex 12, and the like (all of which are names of products manufactured by Cabot Japan K.K.).

Although a pigment that is used in white ink is not particularly limited, examples thereof include C.I. Pigment White 6, 18, and 21 and white inorganic pigment of titanium oxide, zinc oxide, zinc sulfide, antimony oxide, magnesium oxide, and zirconium oxide. A white organic pigment such as white hollow fine resin particles and polymer particles can also be used in addition to the white inorganic pigment.

Although a pigment used in yellow ink is not particularly limited, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Although a pigment that is used in magenta ink is not particularly limited, examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50, and the like.

Although a pigment that is used in cyan ink is not particularly limited, examples thereof include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Although a pigment that is used in color ink other than magenta, cyan, and yellow ink is not particularly limited, and examples thereof include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Although a pearl pigment is not particularly limited, examples thereof include a pigment that has pearly glossiness or interfering glossiness such as titanium dioxide-coated mica, fish scale foil, and bismuth chloride.

Although a metallic pigment is not particularly limited, examples thereof include particles of a monomer or an alloy of aluminum, silver, gold, platinum, nickel, chromium, tin, zinc, indium, titanium, copper, and the like.

A lower limit value of the content of the coloring material that can be included in the color ink is preferably equal to or greater than 0.5% by mass, more preferably equal to or greater than 1% by mass, and is further preferably equal to or greater than 3% by mass with respect to the total mass of the ink composition. Meanwhile, an upper limit value of the content of the coloring material that can be included in the color ink is preferably equal to or less than 10% by mass, is more preferably equal to or less than 7% by mass, and is further preferably equal to or less than 6% by mass with respect to the total mass of the ink composition. If the content of the coloring material falls within the aforementioned range, an image formed on the recording medium has excellent water resistance, gas resistance, light resistance, and the like and satisfactory ink preservation properties.

Note that in the embodiment, the content of the coloring material in the dark ink composition is preferably larger than the content of the coloring material in the light ink composition by 1% by mass or more, is more preferably larger than the content of the coloring material in the light ink composition by 2% or more, and is further preferably larger than the content of the coloring material in the light ink composition by 3% by more. If the difference between the content of the coloring material in the dark ink composition and the content of the coloring material in the light ink composition falls within the aforementioned range, it is possible to obtain an image with high grayscale properties and high quality.

The content of the coloring material in the light ink composition is preferably equal to or less than 1.5% by mass, is more preferably equal to or less than 1% by mass, is further preferably equal to or less than 0.8% by mass, is further more preferably equal to or less than 0.6% by mass, and is particularly preferably equal to or less than 0.5% by mass with respect to the total mass of the ink composition. Although the lower limit of the content is not limited, the lower limit of the content is preferably equal to or greater than 0.05% by mass, is more preferably equal to or greater than 0.1% by mass, and is further preferably equal to or greater than 0.3% by mass.

The lower limit of the content of the coloring material included in the dark ink composition is preferably greater than 1.5% by mass, is more preferably equal to or greater than 2.0% by mass, and is further preferably equal to or greater than 3.0% by mass with respect to the total mass of the ink composition. The upper limit of the content is preferably equal to or less than 10% by mass, is more preferably equal to or less than 7% by mass, and is further preferably equal to or less than 6% by mass with respect to the total mass of the ink composition.

In order to apply the aforementioned pigment to the ink composition, it is necessary for the pigment to be able to be stably dispersed and held in water. Examples of the method include a method of dispersing the pigment with dispersant resin such as water-soluble resin and/or water-dispersible resin (hereinafter, the pigment dispersed by this method will also be referred to as a "resin-dispersed pigment"), a method of dispersing the pigment with a surfactant such as a water-soluble surfactant and/or a water-dispersible surfactant (hereinafter, the pigment dispersed by this method will also be referred to as a "surfactant-dispersed pigment"), and a method of chemically/physically introducing a hydrophilic functional group to the surfaces of pigment particles to enable dispersion and/or dissolving of the pigment in water without using a dispersant such as a resin or a surfactant as described above (hereinafter, the pigment dispersed by this method will also be referred to as a "surface-processed pigment"). In the embodiment, any of the resin-dispersed pigment, the surfactant-dispersed pigment, and the surface-processed pigment can be used in the ink composition, and a plurality of types of resin can be mixed and used as needed.

Examples of the resin dispersant used in the resin-dispersed pigment includes polyvinyl alcohols, polyvinyl pyrrolidones, a polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleic acid ester copolymer, a vinyl acetate-crotonic acid copolymer, a vinyl acetate-acrylic acid copolymer, and the like and salts thereof. Among these examples, a copolymer of a monomer that has a hydrophobic functional group and a monomer that has a hydrophilic functional group and a polymer including a monomer that has both a hydrophobic functional group and a hydrophilic functional group are particularly preferably used. As a form of the copolymer, the copolymer may be used in any form of a random copolymer, a block copolymer, an alternate copolymer, and a graft copolymer.

Examples of the aforementioned salt include salts with a basic compound such as ammonia, ethylamine, diethylamine, triethylamine, propylamine, isopropylamine, dipropylamine, butylamine, isobutylamine, dethanolamine, triethanolamine, tri-iso-propanolamine, aminomethylpropanol, or a morpholine. The amount of addition of these basic compounds is not particularly limited as long as the amount is equal to or greater than the neutralization equivalent of the aforementioned resin dispersant.

As for the molecular weight of the aforementioned resin dispersant, the weight average molecular weight is preferably within a range of equal to or greater than 1,000 and equal to or less than 100,000 and is more preferably within a range of equal to or greater than 3,000 and equal to or less than 10,000. If the molecular weight falls within the aforementioned range, stable dispersion of the pigment in water is achieved, and viscosity control and the like can easily be performed when the pigment is applied to the ink composition.

As the aforementioned resin dispersant, a commercially available product can also be used. Specific examples include Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), and Joncryl 690 (weight average molecular weight: 16,500, acid value: 240) (all of which are names of products manufactured by BASF Japan) and the like.

Examples of the surfactant used in the surfactant-dispersed pigment include anionic surfactants such as alkane sulfonate, α-olefin sulfonate, alkyl benzene sulfonate, alkyl naphthalene sulfonate, acyl methyl taurate, dialkyl sulfosuccinate, an alkyl sulfate ester salt, sulfated olefin, a polyoxyethylene alkyl ether sulfate ester salt, an alkyl phosphate ester salt, a polyoxyethylene alkyl ether phosphate ester salt, and a monoglyceride phosphate ester salt, amphoteric surfactants such as an alkyl pyridinium salt, an alkyl amino salt, and alkyl dimethyl betaine, and nonionic surfactants such as polyoxyethylene alkyl ether, polyoxyethylene alkyl phenyl ether, polyoxyethylene alkyl ester, polyoxyethylene alky amide, glycerin alkyl ester, and sorbitan allyl ester.

The amount of addition of the aforementioned resin dispersant or the aforementioned surfactant with respect to the pigment is preferably equal to or greater than 1 parts by mass and equal to or less than 100 parts by mass and is more preferably equal to or greater than 5 parts by mass and equal to or less than 50 parts by mass with respect to 100 parts by mass of the pigment. If the amount of addition falls within the range, it is possible to secure dispersion stability of the pigment in water.

Examples of the hydrophilic functional group in the surface-processed pigment include —OM, —COOM, —CO—, —$SO_3M$, —$SO_2NH_3$, —$RSO_3M$, —$PO_3HM$, —$PO_3M_3$, —$SO_3NHCOR$, —$NH_3$, —$NR_3$ (where M in formulae represents a hydrogen atom, alkali metal, ammonium, or organic ammonium, and R represents an alkyl group having 1 to 12 carbon atoms, a phenyl group that may have a substituent, or a naphthyl group that may have a substituent), and the like. These functional groups are physically and/or chemically introduced by being grafted to the surfaces of the pigment particles directly and/or via another group. Examples of the polyvalent group include an alkylene group having 1 to 12 carbon atoms, a phenylene group that may have a substituent, a naphthylene group that may have a substituent, and the like.

As the aforementioned surface-processed pigment, a pigment that has been surface-processed such that —$SO_3M$ and/or —$RSO_3M$ (M is a counterion and represents a hydrogen ion, an alkali metal ion, an ammonium ion, or an organic ammonium ion) is chemically bonded to the surfaces of the pigment particles with a processing agent including sulfur, that is, a pigment that is obtained by dispersing the pigment in a pigment insoluble or slightly soluble solvent in which the pigment does not have an active proton and does not exhibit reactivity with a sulfonic acid and then performing surface processing such that —$SO_3M$ and/or —$RSO_3M$ is chemically bonded to the surfaces of particles with an amidesulphuric acid or a complex of sulfur trioxide and tertiary amine and the resin can be dispersed and/or dissolved in water.

As a surface processing mechanism of grafting the functional groups or salts thereof to the surfaces of the pigment particles directly or via a polyvalent group, various known surface processing mechanisms can be applied. Although examples thereof include a mechanism of causing ozone or a sodium hypochlorite solution to act on commercially available oxidized carbon black and further performing oxidation processing on the carbon black such that the surface is processed to be more hydrophilic (for example, JP-A-7-258578, JP-A-8-3498, JP-A-10-120958, JP-A-10-195331, and JP-A-10-237349), a mechanism of processing carbon black with 3-amino-N-alkyl-substituted pyridinium bromide (for example, JP-A-10-195360 and JP-A-10-330665), a mechanism of dispersing an organic pigment in a solvent in which the organic pigment is insoluble or slightly soluble and introducing a sulfone group into the surfaces of the pigment particles with a sulfonating agent (for example, JP-A-8-283596, JP-A-10-110110, and JP-A-10-110111), a mechanism of dispersing an organic pigment in a basic solvent that forms a complex with sulfur trioxide, processing the surfaces of the organic pigment by adding the sulfur trioxide, and introducing a sulfone group or a sulfone amino group (for example, JP-A-10-110114), and the like, the mechanism of producing the surface-processed pigment used in the invention is not limited to these mechanisms.

A single functional group or a plurality of types of functional groups may be grafted to one pigment particle. The types and the degrees of the functional groups to be grafted may be appropriately decided in consideration of dispersion stability in the ink, a color density, drying properties on an ink jet head surface, and the like.

As method of dispersing the resin-dispersed pigment, the surfactant-dispersed pigment, and the surface-processed pigment as described above in water, the dispersion can be performed by adding a pigment, water, and a resin dispersant for the resin-dispersed pigment, a pigment, water, and a surfactant for the surfactant-dispersed pigment, a surface-processed pigment and water for the surface-processed pigment, adding a water-soluble organic solvent, a neutralizer, and the like as needed, and using a dispersing machine that is used in the related art, such as a ball mill, a sand mil, an attritor, a roll mill, an agitator mill, a Henschel mixer, a colloid mill, an ultrasonic homogenizer, a jet mill, or an angmill. In this case, it is preferable to disperse the pigment until the volume average particle diameter falls within a range of equal to or greater than 20 nm and equal to or less than 500 nm, more preferably falls within a range of equal to or greater than 50 nm and equal to or less than 200 nm in terms of particle diameters of the pigment in order to secure dispersion stability of the pigment in water.

Resin

In the embodiment, the light ink composition and the dark ink composition preferably contains resin, respectively. The resin has an effect of solidifying the ink composition and further firmly fixing the ink solid on the recording medium. In the embodiment, the resin may be in either a state in which the resin is dissolved in the ink composition or a state in which the resin is dispersed in the ink composition. As the resin in the dissolved state, it is possible to use the aforementioned resin dispersant that is used in a case in which the pigment of color ink is dispersed. It is possible to include the resin in the dispersed state by dispersing resin that is insoluble or slightly soluble in a liquid medium of color ink in the form of fine particles, that is, in an emulsion state or a suspension state.

Although the resin used in the embodiment is not particularly limited, examples thereof include urethane-based resin, acrylic resin, styrene-acrylic resin, fluorene-based resin, polyolefin-based resin, rosin-modified resin, terpene-based resin, polyester-based resin, polyamide-based resin, epoxy-based resin, vinyl chloride-based resin, a vinyl chloride-vinyl acetate copolymer, ethylene vinyl acetate, and the like. Although such resin is handled in the form of emulsion in many cases, the resin may have powder characteristics. Also, one kind of resin may be used alone, or two or more kinds of resin may be used in combination.

The urethane-based resin is a name collectively referring to resin that has a urethane bond. As the urethane-based resin, polyether-type urethane resin that includes an ether bond at a main chain, a polyester-type urethane resin that includes an ester bond at a main chain, a polycarbonate-type urethane resin that includes a carbonate bond at a main chain, or the like instead of the urethane bond may be used. A commercially available product may be used as the urethane-based resin, examples of the commercially available product that may be used include Superflex 460, 460s, 840, and E-4000 (names of products manufactured by DKS Co., Ltd.), Resamine D-1060, D-2020, D-4080, D-4200, D-6300, and D-6455 (names of products manufactured by Dainichiseika Color & Chemicals Mfg. Co., Ltd.), Takelac WS-6021 and W-512-A-6 (names of products manufactured by Mitsui Chemicals Polyurethanes Inc.) Sun Cure 2710 (name of product manufactured by The Lubrizol Corporation), Permarin UA-150 (name of product manufactured by Sanyo Chemical Industries, Ltd.), and the like.

The acrylic resin is a name that collectively refers to polymers that can be obtained by polymerizing at least an acrylic monomer such as (methacrylic acid or (meth)acrylic acid ester, and examples thereof (meth)acrylic resin obtained from an acrylic monomer, a copolymer of an acrylic monomer and another monomer (for example, a vinyl-based monomer such as styrene), and the like. As the acrylic monomer, acrylamide, acrylonitrile, or the like can also be used. A commercially available product may also be used as a resin emulsion that includes the acrylic resin as an ingredient, and examples thereof include FK-854 (name of product manufactured by Chirika Co., Ltd.), Mowinyl 952B and 718A (name of product manufactured by Nippon Synthetic Chemical Industry Co., Ltd.), Nipol LX852 and LX874 (name of product manufactured by Zeon Corporation), and the like.

Note that in the specification, the acrylic resin may include styrene-acrylic resin, which will be described later. In the specification, representation of (meth)acryl means at least either acryl or methacryl.

The styrene-acrylic resin is a copolymer that is obtained from a styrene monomer and acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, styrene-α-methylstyrene-acrylic acid ester copolymer, and the like. A commercially available product may also be used as the styrene-acrylic resin, and examples thereof include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (names of products manufactured by BASF Japan), Mowinyl 966A and 975N (names of products manufactured by Nippon Synthetic Chemical Industry Co., Ltd.), Vinyblan 2586 (name of product manufactured by Nisshin Chemical Co., Ltd.), and the like.

The polyolefin-based resin has olefin such as ethylene, propylene, or butylene in a structure skeleton, and known polyolefin-based resin can appropriately be selected and used. A commercially available product can be used as the olefin resin, and examples thereof include Arrow Base CB-1200 and CD-1200 (name of product manufactured by Unitika Ltd.) and the like.

In order to obtain the aforementioned resin in the fine particle state, the resin can be obtained by the methods described below, any of the methods may be used, and a plurality of methods may be combined as needed. The methods include a method of mixing a polymerization catalyst (polymerization initiator) and a dispersant in a monomer that forms desired resin, that is, emulsion-polymerizing the polymerization catalyst and the dispersant, a method of dissolving resin that has a hydrophilic part in a water-soluble organic solvent, mixing the solution in water, then removing the water-soluble organic solvent through distillation or the like, thereby obtaining the resin, a method of dissolving resin in a non-water-soluble organic solvent, and mixing the solution in an aqueous solution along with a dispersant, thereby obtaining the resin, and the like. The aforementioned methods can appropriately be selected in accordance with the type and characteristics of the used resin. Although the dispersant that can be used to disperse the resin is not particularly limited, examples thereof that can be used include anionic surfactant such as a salt of sodium dodecylbenzenesulfonate, a salt of sodium lauryl phosphate, a salt of polyoxyethylene alkyl ether sulfate ammonium, and for example, nonionic surfactant such as polyoxyethylene alkyl ether, poyoxyethylene alkyl ester, polyoxyethylene sorbitan fatty acid ester, and polyoxyethylene alkyl phenyl ether, and one kind of the dispersant can be used alone, or two or more kinds of the dispersant can be mixed and used.

In a case in which the aforementioned resin is used in a fine particle state such as an emulsion state or a suspension state, it is possible to use the resin that can be obtained by known materials and a known method. For example, the resin described in JP-B-62-1426, JP-A-3-56573, JP-A-3-79678, JP-A-3-160068, JP-A-4-18462, and the like may be used.

The resin may be supplied in the form of an emulsion, and examples of a commercially available product of such a resin emulsion include MicroGel E-1002 and E-5002 (all of which are names of products manufactured by Nipponpaint Co., Ltd.; styrene-acrylic resin emulsion), Voncoat 4001 (which is a name of a product manufactured by DIC Corporation; acrylic resin emulsion), Voncoat 5454 (which is a name of a product manufactured by DIC Corporation; styrene-acrylic resin emulsion), Polysol AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate-resin emulsion), Polysol AD-13, AD-2, AD-10, AD-96, AD-17, and AD-70 (ethylene-vinyl acetate resin emulsion), Polysol PSASE-6010 (ethylene-vinyl acetate resin emulsion) (all of which are names of products manufactured by Showa Denko K.K.), Polysol SAE 1014 (which is a name of a product manufactured by Zeon Corporation; styrene-acrylic resin emulsion), Saibinol SK-200 (which is a name of a product manufactured by Saiden Chemical Industry Co., Ltd.; acrylic resin emulsion), AE-120A (which is a name of a product manufactured by JSR Corporation; acrylic resin emulsion), AE373D (which is a name of a product manufactured by Emulsion Technology Co., Ltd.; carboxy-modified styrene-acrylic resin emulsion), Seikadain 1900W (which is a name of a product manufactured by Dainichiseika Color & Chemicals Mfg. Co., Ltd.; ethylene-vinyl acetate resin emulsion), Vinyblan 2682 (acrylic resin emulsion), Vinyblan 2886 (vinyl acetate-acrylic resin emulsion), Vinyblan 5202 (acrylic acetate resin emulsion), (which is a name of a product manufactured by Nisshin Chemical Co., Ltd.), Elitel KA-5071S, KT-8803, KT-9204, KT-8701, KT-8904, and KT-0507 (all of which are names of products manufactured by Unitika Ltd.; polyester resin emulsion), Hi-Tech SN-2002 (which is a name of a product manufactured by Toho Chemical Industry Co., Ltd.; polyester resin emulsion), Takelac W-6020, W-635, W-6061, W-605, W-635, and W-6021 (all of which are names of products manufactured by Mitsui Chemicals Polyurethanes Inc.; urethane-based resin emulsion), Superflex 870, 800, 150, 420, 460, 470, 610, and 700 (all of which are names of products manufactured by DKS Co., Ltd.; urethane-based resin emulsion), Permarin UA-150 (name of product manufactured by Sanyo Chemical Industries, Ltd.; urethane-based resin emulsion), Sun Cure 2710 (name of product manufactured by The Lubrizol Corporation; urethane-based resin emulsion), Neo-Rez R-9660, R-9637, and R-940 (all of which are names of products manufactured by Kusumoto Chemicals, Ltd.; urethane-based resin emulsion), Adekabontiter HUX-380, 290K (all of which are names of products manufactured by ADEKA; urethane-based resin emulsion), Mowinyl 966A and Mowinyl 7320 (all of which are names of products manufactured by Nippon Synthetic Chemical Industry Co., Ltd.), Joncryl 7100, 390, 711, 511, 7001, 632, 741, 450, 840, 74j, HRC-1645J, 734, 852, 7600, 775, 537J, 1535, PDX-7630A, 352J, 352D, PDX-7145, 538J, 7640, 7641, 631, 790, 780, and 7610 (all of which are names of products manufactured by BASF Japan), NK binder R-5HN (which is a name of a product manufactured by Shin-Nakamura Chemical Co., Ltd.), Hydran WLS-210 (which is a name of a product manufactured by DIC Corporation; non-crosslinked polyurethane), Joncryl 7610 (which is a name of a product manufactured by BASF Japan), and the like.

The resin may include composite resin. The composite resin is formed of two or more kinds of resin with mutually different configurations of monomer constituents that form the resin, namely, at least either resin of different kinds or resin with different content ratios regardless of which parts of the resin the two or more kinds of resin forms. The two or more kinds of resin are not limited to resin that can be distinguished at discontinuous configurations of the resin at the boundary therebetween and may be resin with continuously different configurations of the monomer constituents.

In the case in which the resin is used in the fine particle state, the volume average particle diameter is preferably within a range of equal to or greater than 5 nm and equal to or less than 400 nm and is more preferably within a range of equal to or greater than 50 nm and equal to or less than 200 nm from the viewpoint of securing preservation stability and ejection reliability of the ink composition. If the volume average particle diameter of the fine resin particles fall within the aforementioned range, excellent film formation properties are achieved, large lumps tend not to be generated even if the particles are coagulated, and it is thus possible to reduce clogging of the nozzles. Note that the volume average particle diameter in the specification can be measured by a granular size distribution measurement device that employs a dynamic light scattering theory as a measurement principle, for example. Examples of such a granular size distribution measurement device include "Microtrac UPA" manufactured by Nikkiso Co., Ltd.

The glass transition temperature (Tg) of the resin is preferably equal to or greater than $-20°$ C. and equal to or less than $100°$ C., is more preferably equal to or greater than $-10°$ C. and equal to or less than $80°$ C., and is further preferably equal to or greater than $0°$ C. and equal to or less than $76°$ C., for example.

Further, in the case in which the resin is used in the fine particle state in the embodiment, a change in the volume average particle diameter after the water dispersion of the fine resin particles included in the color ink and 0.3M magnesium sulfate aqueous solution are mixed in an environment at $25°$ C. with respect to that before the mixing (also simply referred to as a "change in particle diameters") is preferably equal to or less than three times, is more preferably equal to or less than two times, is further preferably equal to or less than 1.5 times, and is particularly preferably equal to or less than 1.3 times. Although the lower limit is not limited, the average particle diameter may not change before and after the mixing, or the lower limit may be equal to or greater than 0.8 times, may be equal to or greater than 1.0 times, or may be equal to or greater than 1.1 times.

The measurement of the change in the particle diameter is performed as follows.

A water-mediated solution of resin used for preparing the ink or the like is prepared. The water-mediated solution of the resin is a resin emulsion solution or the like, for example. Here, in a case in which the content of the resin in the water-mediated solution of the resin is equal to or greater than 1% by mass, a water-mediated solution in which the content of the resin is 1% by mass is obtained by diluting the water-mediated solution with pure water. In a case in which the content of the resin in the water-mediated solution of the resin is less than 1% by mass, the water-mediated solution is used as it is. In the case in which the thus obtained water-mediated solution of the resin contains 1% by mass of resin, the water-mediated solution of the resin and the 0.3M magnesium sulfate aqueous solution are mixed at a mass ratio of 1:1. If the thus obtained water-mediated solution of the resin contains less than 1% by mass of resin, the water-mediated solution of the resin and the 0.3M magnesium sulfate aqueous solution are mixed at a mass ratio of 1:X, where X represents mass % of resin. The mixing ratio is set in this manner. Note that the 0.3M magnesium sulfate aqueous solution to be mixed with the water-mediated solution of the resin is also referred to as a test solution.

The obtained mixture solution is stirred. The stirring is performed such that the entire mixture solution flows, and for example, the stirring is performed for about 10 seconds such that the liquid surface of the mixture solution is formed into a mortar shape using a magnetic stirrer, for example. The volume average particle diameter of the resin in the mixture solution after the stirring and the volume average particle diameter of the resin in the resin water dispersion after the stirring are measured. Then, the volume average particle diameter before the mixing be/the volume average particle diameter after the mixing=a change is obtained in the particle diameter. Note that the mixture, the stirring, and the measurement are respectively performed at the room temperature (25° C.).

The volume average particle diameter can be measured by a granular size distribution measurement device employing a dynamic light scattering theory as a measurement principle, for example. Examples of such a granular size distribution measurement device include "Microtrac UPA" manufactured by Nikkiso Co., Ltd.

If the change in the particle diameter of the fine resin particles included in the ink is small, it is possible to provide an ink set and a recording method that provides more excellent abrasion resistance and image quality. Examples of such resin with low reactivity include urethane-based resin and acrylic resin from among the resin described above. In particular, a small change in the particle diameter of the resin included in the clear ink is preferable since excellent abrasion resistance is achieved.

As such resin with a relatively low increase rate of the volume average particle diameter, resin that is less coagulated by magnesium sulfate included in a test solution may be used. Examples of such resin include fine resin particles of an emulsifier dispersion-type, and/or preferable examples thereof include resin with a low acid value obtained by a potential difference measurement method based on JIS-K2501. Resin with an acid value of equal to or less than 10 mgKOH/g is preferably used, and resin with an acid value of equal to or less than 5 mgKOH/g is further preferably used. The lower limit of the acid value may be 0 mgKOH/g.

In order to obtain the increase rate of the volume average particle diameter of the resin within the aforementioned range, emulsion dispersion of the fine resin particles of the emulsifier dispersion type is performed using an increased amount of emulsifier, for example.

The lower limit value of the total content of the resin is preferably equal to or greater than 1% by mass, is more preferably equal to or greater than 2% by mass, and is further preferably equal to or greater than 3% by mass with respect to the total mass of the ink composition in terms of solid content. The upper limit of the content of the resin is preferably equal to or less than 15% by mass, is more preferably equal to or less than 10% by mass, is further preferably equal to or less than 7% by mass, and is particularly preferably equal to or less than 5% by mass with respect to the total mass of the ink composition. If the content of the resin falls within the aforementioned range, it is possible to secure clogging resistance during recording and to form an image with excellent abrasion resistance even on the ink low-absorbable or non-absorbable recording medium.

Organic Solvent

In the embodiment, the color ink preferably contains an organic solvent. It is possible to achieve excellent clogging resistance during recording and satisfactory drying properties of the color ink ejected onto the recording medium and to obtain an image with excellent image quality and abrasion resistance by the color ink containing the organic solvent.

The organic solvent used in the color ink is preferably a water-soluble organic solvent. It is possible to achieve more satisfactory drying properties of the ink composition and to obtain an image with excellent image quality and abrasion resistance by using the water-soluble organic solvent.

Although the water-soluble organic solvent is not particularly limited, examples thereof include alkanediols, polyols, a nitrogen-containing solvent, esters, glycol ethers, cyclic esters, and the like.

Examples of alkanediols include ethylene glycol, propylene glycol, 1,2-propandiol, 1,2-butandiol, 1,2-pentanediol, 1,2-hexanediol, 1,2-octanediol, and the like that are 1,2-alkanediols, 1,3-propanedio, 1,4-butandiol, 1,6-hexanediol, and the like. One kind of alkanediols may be used alone, or two or more kinds of alkanediols may be used in combination. The alkanediols have an excellent effect of enhancing wettability of the ink composition with respect to the recording medium and uniformly wetting the recording medium or an excellent effect as a penetrating solvent for the recording medium. Among these examples, 1,2-alkanediols, in particular, have an excellent effect as a penetrating solvent, and are preferably used. Preferable examples of alkanediols include diol of alkane having 5 or more carbon atoms. The number of carbon atoms of alkane is preferably from 5 to 9, and either a linear type or a branched type may be used.

Examples of polyols include diethylene glycol, triethylene glycol, dipropyrene glycol, 2-ethyl-2-methyl-1,3-propandiol, 2-methyl-2-propyl-1,3-propandiol, 2-methyl-1,3-propandiol, 2,2-dimethyl-1,3-propandiol, 3-methyl-1,3-butandiol, 2-ethyl-1,3-hexandiol, 3-methyl-1,5-pantandiol, 2-methypentan-2,4-diol, trimethylolpropane, glycerin, and the like. One kind of polyols may be used alone, or two or more kinds of polyols may be mixed and used. The polyols have an excellent effect as a moisturizer. Examples of polyols include alkane preferably having 4 or less carbon atoms that have two or more hydroxyl groups and alkane having 4 or less carbon atoms that have two or more hydroxyl groups in which the hydroxyl groups have caused inter-molecular condensations. The number of condensations is preferably two to four. Here, polyols are compounds that have two or more hydroxyl groups in a molecule, and in the embodiment, the number of hydroxyl groups is preferably two or three.

Examples of the nitrogen-containing solvent include pyrrolidones such as N-methyl-2-pyrrolidon, N-ethyl-2-pyrrolidon, N-vinyl-2-pyrrolidon, 2-pyrrolidon, N-butyl-2-pyrrolidon, 5-methyl-2-pyrrolidon, and the like. One kind of nitrogen-containing solvents may be used alone or two or more kinds of the nitrogen-containing solvents may be mixed and used. The nitrogen-containing solvent acts as a satisfactory dissolving agent for resin, and it is possible to obtain a recorded product with excellent abrasion resistance and to prevent clogging of the ink jet head and the nozzles.

Examples of the nitrogen-containing solvent include alkoxy alkyl amides, and examples thereof include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N- dimethylpropionamide, 3-n-propoxy-N,N-diethypropionamide, 3-n-propoxy-N,N-methyethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of the nitrogen-containing solvent also include an amide-based solvent. Preferable examples of the amide-based solvent include a cyclic amide-based solvent and a non-cyclic amide-based solvent. Examples of the cyclic amide-based solvent include the aforementioned pyrrolidones. Examples of the non-cyclic amide-based solvent include the aforementioned alkoxy alkyl amides.

The content of the nitrogen-containing solvent with respect to the ink composition is preferably equal to or greater than 3% by mass and equal to or less than 30% by mass, is more preferably equal to or greater than 5% by mass and equal to or less than 25% by mass, and is preferably equal to or greater than 10% by mass and equal to or less than 20% by mass. In this case, excellent abrasion resistance, image quality, and the like are achieved, which is preferable. The content of the amide-based solvent as the nitrogen-containing solvent with respect to the ink within the aforementioned range is preferable in terms of the aforementioned points.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propyrene glycol monomethyl ether acetate, dipropylene glycol monomethyl ether acetate, and methoxybutyl acetate, and glycol diesters such as ethylene glycol diacetate, diethylene glycol diacetate, propylene glycol diacetate, dipropylene glycol diacetate, ethylene glycol acetate propionate, ethylene glycol acetate butylate, dietylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

As glycol ethers, monoether or diether of alyklene glycol may be used, and alkyl ether is preferably used. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol ethyl ether, triethylene glycol dibutyl ether, triethylene glycol methyl butyl ether, tetraethylee glycol dimethyl ether, tetraethylene glycol dethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. These can control wettability and the like of the ink composition with respect to the recording medium.

As for aforementioned alkylene glycol, diether tends to dissolve or swell the resin particles in the ink composition than monoether, and diether is preferable from a viewpoint of improving abrasion resistance of the formed image.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and compounds obtained by substituting hydrogen of a methylene group that is adjacent to a carbonyl group therein with an alkyl group having 1 to 4 carbon atoms.

The content of the organic solvent is preferably equal to or greater than 1% by mass, is more preferably equal to or greater than 5% by mass, and is further preferably equal to or greater than 10% by mass with respect to the total mass of the ink composition. The content of the organic solvent is preferably equal to or less than 40% by mass, is more preferably equal to or less than 35% by mass, and is further preferably equal to or less than 30% by mass with respect to the total mass of the ink composition. In a case in which the content of the organic solvent falls within the aforementioned range, the ink composition has more excellent clogging resistance and abrasion resistance, which is preferable.

The standard boiling point of the organic solvent is equal to or greater than 180° C., is more preferably equal to or greater than 200° C., and is further preferably equal to or greater than 210° C. The standard boiling point of the organic solvent is preferably equal to or less than 300° C., is more preferably equal to or less than 270° C., and is further preferably equal to or less than 250° C. In a case in which the standard boiling point of the organic solvent falls within the aforementioned range, the ink composition has more excellent clogging resistance and abrasion resistance, which is preferable.

Note that the polyols with a standard boiling point of equal to or greater than 280° C., such as triethylene glycol or glycerin, functions as a moisturizer, the drying of the ink jet head is suppressed, and ejection is stabilized if the polyols are contained. Meanwhile, the polyols with the standard boiling point of equal to or greater than 280° C. may absorb moisture of the ink composition, increase viscosity of the ink near the ink jet head, and degrade drying properties of the ink when the polyols adhere to the recording medium. Therefore, the content of the polyols with the standard boiling point of equal to or greater than 280° C. in the ink composition is preferably equal to or less than 3% by mass, is more preferably equal to or less than 2% by mass, is more preferably equal to or less than 1% by mass, is further preferably equal to or less than 0.8% by mass, and is particularly preferably equal to or less than 0.1% by mass with respect to the total mass of the ink composition in the embodiment. In this case, since the drying properties of the ink composition on the recording medium increase, the ink composition is suitable for performing recording on a low-absorbable recording medium or a non-absorbable recording medium, in particular, and an image with excellent abrasion resistance is obtained.

Further, the content of the organic solvent (not limited to polyols) with the standard boiling point of equal to or greater than 280° C. in the water-based ink jet ink composition preferably falls within the aforementioned range in terms of the aforementioned points.

Water

In the embodiment, the color ink contains water. Water is a main medium of the color ink and is a constituent that evaporates and flies by being dried. Water is preferably pure water such as ion exchanged water, ultrafiltration water, reverse osmosis water, or distilled water or water from which ionic impurities have been removed as much as possible such as ultrapure water is preferably used. Water sterilized by ultraviolet irradiation, addition of hydrogen peroxide, or the like is preferably used since it is possible to prevent mold and bacteria from being generated in a case in which the ink composition is stored for a long period of time.

The content of water is preferably equal to or greater than 40% by mass, is more preferably equal to or greater than 50% by mass, and is further preferably equal to or greater than 60% by mass with respect to the total mass of the color ink.

Surfactant

In the embodiment, the color ink preferably contains a surfactant. Although the surfactant is not particularly limited, examples thereof include an acetylene glycol-based surfactant, a fluorine-based surfactant, and a silicone-based surfactant, at least one kind of them is preferably contained, and the silicone-based surfactant is more preferably contained from among them. If the ink contains the silicone-based surfactant, dynamic surface tension of the ink decreases, and it is possible to improve clogging resistance.

Although the acetylene glycol-based surfactant is not particularly limited, examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all of which are names of products manufactured by Air Products and Chemicals, Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all of which are names of products manufactured by Nisshin Chemical Co., Ltd.), and Acetylenol E00, E00P, E40, and E100 (all of which are names of products manufactured by Kawaken Fine Chemicals Co., Ltd.).

Although the silicon-based surfactant is not particularly limited, preferable examples include a polysiloxane compound. Although the polysiloxane-based compound is not particularly limited, examples thereof include polyether-modified organosiloxane. Examples of commercially available products of the polyether-modified organosiloxane include BYK-306, BYK-307, BYK-333, BYK-341, BYK-345, BYK-346, and BYK-348 (all of which are names of products manufactured by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of which are names of products manufactured by Shin-Etsu Chemical Co., Ltd.).

A fluorine-modified polymer is preferably used as the fluorine-based surfactant, and specific examples thereof include BYK-340 (name of product manufactured by BYK Additives & Instruments).

In the case in which the surfactant is contained, the content can be preferably equal to or greater than 0.1% by mass and equal to or less than 1.5% by mass and is preferably equal to or greater than 0.5% by mass and equal to or less than 1% by mass with respect to the total mass of the ink composition.

Other Constituents to be Contained

In the embodiment, it is also possible to appropriately add, to the ink composition, various additives such as an antifoaming agent, a solubilizer, a viscosity adjuster, a pH adjuster, a polyolefin wax, an antioxidant, an antiseptic, a fungicide, a corrosion inhibitor, a moisturizer that is not an organic solvent, a chelating agent for capturing a metal ion that affects dispersion, and the like in order to satisfactorily maintain preservation stability and ejection stability of the ink jet head, in order to solve clogging, or in order to prevent the ink from being degraded.

Examples of the pH adjuster include potassium dihydrogen phosphate, sodium dihydrogen phosphate, sodium hydroxide, lithium hydroxide, potassium hydroxide, ammonia, diethanolamine, triethanolamine, trisopropanolamine, potassium carbonate, sodium carbonate, sodium hydrogen carbonate, and the like.

Examples of the polyolefin wax include a wax manufactured by olefin such as ethylene, propylene, or butylene or derivatives thereof, and a copolymer thereof, and specific examples thereof include a polyethylene-based wax, a polypropylene-based wax, a polybutylene-based wax, and the like. A commercially available product can be used as the polyolefin wax, and specific examples thereof that can be used include Nopcoat PEM17 (which is a name of a product manufactured by San Nopco Limited), Chemipearl W4005 (which is a name of a product manufactured by Mitsui Chemicals, Inc.), AQUACER 515 and AQUACER 593 (all of which are names of products manufactured by BYK Additives & Instruments), and the like.

If the polyolefin wax is added, it is possible to improve wettability of the image formed on the ink non-absorbable or low-absorbable recording medium with respect to physical contact and to improve abrasion resistance of the image, which is preferable. The content of the polyolefin wax is preferably equal to or greater than 0.01% by mass and equal to or less than 10% by mass and is more preferably equal to or greater than 0.05% by mass and equal to or less than 1% by mass with respect to the total mass of the ink composition. If the content of the polyolefin wax falls within the aforementioned range, the aforementioned advantages are sufficiently exhibited.

Examples of antiseptic and fungicide include sodium benzoate, sodium pentachlorophenol, 2-pyridinethiol-1-oxide sodium, sodium sorbate, sodium dehydroacetate, 1,2-dibenzoisothiazoline-3-one, and the like. Examples of a commercially available product include Proxel XL2 and Proxel GXL (all of which are names of products manufactured by Avecia Ltd.), Denicide CSA and NS-500W (which is a name of a product manufactured by Nagase ChemteX Corporation), and the like.

Examples of the anti-rust agent include benzotriazole and the like.

Examples of the chelating agent include ethylenediaminetetraacetic acid and salts thereof (a disodium dihydrogen ethylenediaminetetraacetate salt and the like).

Examples of the moisturizer that is not an organic solvent include a moisturizer that is solid at an ordinary temperature, such as trimethylolpropane and sugar.

1.2.2. Clear Ink

The clear ink composition that forms the ink set according to the embodiment includes resin. The clear ink composition is not ink that is used to color the recording medium and is ink that is used for other purposes. Although examples of other purposes include an improvement in properties such as abrasion resistance and the like of a recorded product, adjustment of glossiness on the recording medium, fixability of the color ink, improvement in color generating properties, and the like, the purposes are not limited thereto.

The content of the coloring material in the clear ink composition is preferably equal to or less than 0.2% by mass, is more preferably equal to or less than 0.1% by mass, and is further preferably equal to or less than 0.05% by mass, and the lower limit of the content may be 0% by mass. The clear ink composition is not a processing solution, which will be described later. The clear ink composition does not include a coagulant, which will be described later, for example.

Containing of constituents that may be included other than the aforementioned coloring material of the ink composition, the content thereof, the properties, and the like of the clear ink composition may be set independently from the aforementioned ink composition other than the aforementioned points.

As an organic solvent that is contained in the clear ink, the aforementioned examples described for the color ink are exemplified. Also, the content of polyols with the standard boiling point of equal to or greater than 280° C. in the clear ink is preferably equal to or less than 3% by mass, is more preferably equal to or less than 2% by mass, is more preferably equal to or less than 1% by mass, is further preferably equal to or less than 0.8% by mass, and is particularly preferably equal to or less than 0.1% by mass with respect to the total mass of the ink composition.

Further, the clear ink contains the resin described above for the color ink in the embodiment, and the clear ink preferably includes resin in the form of fine resin particles. The volume average particle diameter after the water dispersion of the fine resin particles included in the clear ink and the 0.3M magnesium sulfate aqueous solution are mixed in an environment at 25° C. with respect to that before the mixing is preferably equal to or less than 3 times, is more preferably equal to or less than 2 times, is further preferably equal to or less than 1.5 times, and is particularly preferably equal to or less than 1.3 times. If the fine resin particles included in the clear ink has low reactivity, it is possible to secure abrasion resistance and image quality at the low adhesion portion and further to reduce a glossiness difference between the low adhesion portion and the intermediate adhesion portion or the high adhesion portion in the recording using the dark and light ink and the processing solution. If the fine resin particles included in the clear ink has low reactivity, it is possible to provide an ink set and a recording method with excellent clogging resistance.

Examples of such fine resin particles with low reactivity include the aforementioned fine resin particles, and acrylic resin and urethane resin are preferably used, in particular.

The content of the resin is preferably equal to or greater than 0.5% by mass, is more preferably equal to or greater than 1% by mass, and is further preferably equal to or greater than 3% by mass in terms of solid content with respect to the total mass of the clear ink. The content of the resin is preferably equal to or less than 10% by mass, is more preferably equal to or less than 7% by mass, and is further preferably equal to or less than 5% by mass in terms of solid content with respect to the total mass of the clear ink. If the content of the resin falls within the aforementioned range, it is possible to secure abrasion resistance and image quality at the low adhesion portion and further to reduce a glossiness difference with the intermediate adhesion portion and the high adhesion portion.

Further, the clear ink may contain other constituents such as the surfactant and the like described above for the color ink in the embodiment.

1.2.3. Preparation Method of Ink Composition

In the embodiment, the color ink and the clear ink are obtained by mixing the aforementioned constituents in any order and performing filtration as needed to remove impurities. As a method of mixing the respective constituents, a method of adding materials in order in a container provided with a stirring device, such as a mechanical stirrer or a magnetic stirrer and stirring and mixing the materials therein is preferably used. As a filtration method, centrifugal filtration, filter filtration, or the like can be performed as needed.

1.2.4. Physical Properties of Ink Composition

In the embodiment, the surface tension of the color ink and the clear ink at 20° C. is preferably equal to or greater than 18 mN/m and equal to or less than 40 mN/m, is more preferably equal to or greater than 20 mN/m and equal to or less than 35 mN/m, and is further preferably equal to or greater than 22 mN/m and equal to or less than 33 mN/m from the viewpoint of balance between image quality and reliability as ink for ink jet recording. For measuring the surface tension, it is possible to perform the measurement by checking the surface tension when a platinum plate is wetted with the ink in an environment at 20° C. using an automatic surface tension meter CBVP-Z (name of product manufactured by Kyowa Interface Science, Inc.), for example.

From similar viewpoints, the viscosity of the color ink and the clear ink at 20° C. is preferably equal to or greater than 3 mPa·s and equal to or less than 10 mPa·s and is more preferably equal to or greater than 3 mPa·s and equal to or less than 8 mPa·s in the embodiment. Note that for measuring the viscosity, the viscosity in the environment at 20° C. can be measured using a viscoelasticity tester MCR-300 (name of product manufactured by Pysica), for example.

1.3. Processing Solution

Next, the processing solution will be described.

Note that in the embodiment, the processing solution is a composition that includes a coagulant. The content of the coloring material in the processing solution is equal to or less than 0.2% by mass, is preferably equal to or less than 0.1% by mass, and is more preferably equal to or less than 0.05% by mass, and the lower limit is 0% by mass. The processing solution is not the aforementioned color ink used to color the recording medium and is an auxiliary solution that is used by being caused to adhere to the recording medium before the color ink is caused to adhere or at the same time with the color ink. Also, the processing solution is not the aforementioned clear ink.

Containing of constituents that may be included other than the coloring material of the aforementioned water-based ink jet ink composition, the content thereof, properties, and the like of the processing solution may be set independently from the aforementioned water-based ink jet ink composition other than that the processing solution includes a coagulant. It is possible to record an image with excellent image quality by using the processing solution. Meanwhile, abrasion resistance tends to be inferior. Further, thin lines of the image tend to become thinner, glossiness tends to be degraded, and clogging resistance tends to be degraded.

1.3.1. Coagulant

The processing solution used in the embodiment contains a coagulant that coagulates the constituents of the ink composition. The coagulant and the coloring material, the resin, and the like included in the ink composition quickly react in the color ink adhesion process, which will be described later, by the processing solution including the coagulant. Thus, it is considered that since the dispersion state of the coloring material and the resin in the ink composition is destroyed, the coloring material and the resin are coagulated, and the coagulated product inhibit penetration of the coloring material into the recording medium, the recorded image has excellent improved image quality.

Examples of the coagulant include a polyvalent metal salt, a cationic resin, a cationic compound such as a cationic surfactant, an organic acid, and the like. One kind of these coagulants may be used alone, or two or more kinds of these coagulants may be used in combination. From these coagulants, at least one kind of coagulant selected from a group consisting of a polyvalent metal salt, an organic acid, and a cationic resin is preferably used from the viewpoint of excellent reactivity with the constituents included in the ink composition.

The polyvalent metal salt is a compound that is formed of a polyvalent metal ion of two or more valances and an anion bonded to the polyvalent metal ion and that is soluble in water. Specific examples of the polyvalent metal ion include bivalent metal ion such as $Ca^{2+}$, $Cu^{2+}$, $Ni^{2+}$, $Mg^{2+}$, $Zn^{2+}$, and $Ba^{2+}$; and trivalent metal ion such as $Al^{3+}$, $Fe^{3+}$, and $Cr^{3+}$. Examples of the anion include $Cl^-$, $I^-$, $Br^-$, $SO_4^{2-}$, $ClO^{3-}$, $NO^{3-}$, $HCOO^-$, $CH_3COO^-$, and the like. From among these polyvalent metal salts, a calcium salt and a magnesium salt are preferably used from the viewpoints of stability of the processing solution and reactivity as the coagulant.

Preferable examples of the organic acid include a phosphoric acid, a polyacrylic acid, an acetic acid, a glycol acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrroidone carboxylic acid, a pyrone carboxylic acid, a pyrrole carboxylic acid, a furan carboxylic acid, a pyridine carboxylic acid, a coumaric acid, a thiophene carboxylic acid, a nicotinic acid, derivatives of these compounds, salts thereof, and the like. One kind of the organic acid may be used alone, or two or more kinds of organic acid may be used in combination. Salts of the organic acid that is polyvalent metal salts are included in the polyvalent metal salt.

Examples of the cationic resin include cationic urethane resin, cationic olefin resin, cationic amine-based resin, and the like. The cationic amine-based resin may be any resin that has an amino base, and examples thereof include allylamine resin, polyamine resin, a quaternary ammonium salt polymer, and the like. Examples of the polyamine resin include resin that has an amino base in a main skeleton. Examples of allylamine include resin that has a structure derived from an allyl group in a main skeleton. Examples of the quaternary ammonium salt polymer include resin that has a quaternary ammonium salt in the structure. From among the cationic resin, cationic amine-based resin has excellent reactivity and can easily be obtained, which is preferable.

As the cationic urethane resin, known cationic urethane resin can be appropriately selected and used. A commercially available product can be used as the cationic urethane resin, and examples thereof that can be used include Hydran CP-7010, CP-7020, CP-7030, CP-7040, CP-7050, CP-7060, and CP-7610 (all of which are names of products manufactured by Dainippon Ink and Chemicals, Incorporated), Superflex 600, 610, 620, 630, 640, 650 (all of which are names of products manufactured by DKS Co., Ltd.) Urethane emulsion WBR-2120C and WBR-2122C (all of which are names of products manufactured by Taisei Fine Chemical Co., Ltd.), and the like.

The cationic olefin resin has olefin such as ethylene or propylene in a structure skeleton, and known olefin resin can be optionally selected and used. In addition, the cationic olefin resin may be in an emulsion state in which the cationic olefin resin is dispersed in a solvent including water or organic solvent. A commercially available product can be used as the cationic olefin resin, and examples thereof include Arrow Base CB-1200 and CD-1200 (name of product manufactured by Unitika Ltd.) and the like.

A known cationic allylamine resin can appropriately be selected and used, and examples thereof include polyallylamine hydrochloride, polyallylamineamide sulfate, allylamine hydrochloride-diallylamine hydrochloride copolymer, an allylamine acetate-diallyamine acetate copolymer, an allylamine hydrochloride-dimethylallylamine hydrochloride copolymer, an allylamine-dimethylallylamine copolymer, polydiallylamine hydrochloride, polymethyldiallylamine hydrochloride, polymethyldiallylamineamide sulfate, polymethyldiallylamine acetate, polydiallyldimethylammonium chloride, a diallylamine acetate-sulfur dioxide copolymer, diallylmethylethylammoniumethyl sulfate-sulfur dioxide copolymer, a methyldiallylamine hydrochloride-sulfur dioxide copolymer, a diallyldimethylammonium chloride-sulfur dioxide copolymer, diallyldimethylammonium chloride-acrylamide copolymer, and the like. A commercially available product can be used as such a cationic allylamine resin, and examples thereof that can be used include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (all of which are names of products manufactured by Nittobo Medical Co., Ltd.), Neo-600, Hymoloc Q-101, Q-311, and Q-501, Hi-Macs SC-505 (all of which are names of products manufactured by Hyomo Co., Ltd.), and the like.

Examples of the cationic surfactant include primary, secondary, and tertiary amine salt compounds, an alkylamine salt, dialkylamine salt, aliphatic amine, a benzalkonium salt, a quaternary ammonium salt, a quaternary alkylammonium salt, an alkylpyridinium salt, a sulfonium salt, a phosphonium salt, an onium salt, an imidazolinium salt, and the like. Specific examples of the cationic surfactant include hydrochloride, acetate, and the like of lauryl amine, coconut amine, rosin amine, and the like, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetylpyridinium chloride, cetylpyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The concentration of the coagulant in the processing solution is preferably equal to or greater than 0.5% by mass, is more preferably equal to or greater than 1% by mass, and is further preferably equal to or greater than 3% by mass with respect to the total mass of the processing solution. Also, the concentration of the coagulant in the processing solution is preferably equal to or less than 15% by mass, is more preferably equal to or less than 10% by mass, and is further preferably equal to or less than 5% by mass with respect to the total mass of the processing solution.

1.3.2. Water

The processing solution used in the embodiment is preferably a water-based processing solution that contains water as a main solvent. The water is a constituent that evaporates and flies by being dried after the processing solution is caused to adhere to the recording medium. As the water, pure water such as ion exchanged water, ultrafiltration water, reverse osmosis water, or distilled water or water from which ionic impurities have been removed as much as possible such as ultrapure water is preferably used. Water sterilized by ultraviolet irradiation, addition of hydrogen peroxide, or the like is preferably used since it is possible to prevent mold and bacteria from being generated in a case in which the processing solution is stored for a long period of time. The content of water included in the processing solution can be equal to or greater than 40% by mass, is preferably equal to or greater than 50% by mass, is more preferably equal to or greater than 60% by mass, and is further preferably equal to or greater than 70% by mass with respect to the total mass of the processing solution.

1.3.3. Organic Solvent

The processing solution used in the embodiment may contain an organic solvent. It is possible to improve wettability of the processing solution with respect to the recording medium by containing the organic solvent. An organic solvent that is similar to those exemplified above for the ink composition can be used. Although the content of the organic solvent is not particularly limited, the content thereof can be equal to or greater than 10% by mass and equal to or less than 80% by mass and is preferably equal to or greater than 15% by mass and equal to or less than 70% by mass with respect to the total mass of the processing solution.

A standard boiling point of the organic solvent can be the aforementioned preferable temperature range of the organic solvent that may be contained in the ink composition independently from the standard boiling point of the organic solvent that may be contained in the ink composition. Alternatively, the standard boiling point of the organic solvent is preferably equal to or greater than 180° C., is more preferably equal to or greater than 190° C., and is further preferably equal to or greater than 200° C. Also, the standard boiling point of the organic solvent is preferably equal to or less than 300° C., is more preferably equal to or less than 270° C., and is further preferably equal to or less than 250° C.

Note that the content of a water-soluble organic solvent with a standard boiling point of equal to or greater than 280° C. as the organic solvent in the processing solution is preferably equal to or less than 5% by mass, is more preferably equal to or less than 3% by mass, is more preferably equal to or less than 2% by mass, is further preferably equal to or less than 1% by mass, is more preferably equal to or less than 0.8% by mass, and is particularly preferably equal to or less than 0.1% by mass similarly to that in the aforementioned ink composition. In the aforementioned case, the processing solution is quickly dried, and reduction of stickiness and excellent abrasion resistance of the obtained recorded product are achieved.

1.3.4. Surfactant

A surfactant may be added to the processing solution used in the embodiment. It is possible to reduce surface tension of the processing solution and to improve wettability with respect to the recording medium. Among surfactants, it is possible to preferably use an acetylene glycol-based surfactant, a silicone-based surfactant, or a fluorine-based surfactant, for example. As for specific examples of these surfactants, surfactants that are similar to those exemplified above for the water-based ink jet ink composition can be used. Although the content of the surfactant is not particularly limited, the content can be equal to or greater than 0.1% by mass and equal to or less than 5% by mass with respect to the total mass of the processing solution.

1.3.5. Other Constituents

A pH adjuster, an antiseptic/fungicide, an anti-rust agent, a chelating agent, and the like as described above may be added as needed to the processing solution used in the embodiment.

1.3.6. Preparation Method of Processing Solution

The processing solution used in the embodiment can be manufactured by dispersing/mixing the aforementioned respective constituents by an appropriate method. After the aforementioned respective constituents are sufficiently stirred, filtration is performed to remove coarse particles and foreign matters that may cause clogging, thereby obtaining a target processing solution.

1.3.7. Physical Properties of Processing Solution

The surface tension at 20° C. of the processing solution used in the embodiment is preferably equal to or greater than 18 mN/m and equal to or less than 40 mN/m, is more preferably equal to or greater than 20 mN/m and equal to or less than 35 mN/m, and is further preferably equal to or greater than 22 mN/m and equal to or less than 33 mN/m in a case in which the processing solution is ejected from the ink jet head. For measuring the surface tension, it is possible to perform the measurement by checking the surface tension when a platinum plate is wetted with the processing solution in an environment at 20° C. using an automatic surface tension meter CBVP-Z (name of product manufactured by Kyowa Interface Science, Inc.), for example.

From a similar viewpoint, the viscosity at 20° C. of the processing solution used in the embodiment is preferably equal to or greater than 3 mPa·s and equal to or less than 10 mPa·s and is more preferably equal to or greater than 3 mPa·s and equal to or less than 8 mPa·s. Note that for measuring the viscosity, the viscosity in the environment at 20° C. can be measured using a viscoelasticity tester MCR-300 (name of product manufactured by Pysica), for example.

1.4. Recording Medium

In the embodiment, it is possible to obtain an image with excellent abrasion resistance and excellent image quality in recording on an ink absorbable, ink low-absorbable, or non-absorbable recording medium by using a clear ink in recording using the light ink composition including the light ink composition and the dark ink composition with the processing solution in combination. Since the clear ink and the processing solution are used, in particular, the ink can be preferably used for an ink non-absorbable or low-absorbable recording medium, and it is possible to record an image with excellent abrasion resistance and image quality even in a region in which the amount of the adhering ink is small.

Examples of the ink absorbable recording medium include clothes such as cotton, silk, polyester, polyurethane, and nylon with high ink absorbability, ordinary paper, ink jet dedicated paper, ordinary paper with intermediate absorbability such as high quality paper and recycled paper, copy paper, ink jet dedicated paper provided with an ink receiving layer with an ink absorbing ability.

Examples of the ink low-absorbable recording medium include a recording medium with a coated layer provided on the surface to receive ink. Examples of a recording medium including paper as a base material include print paper such as art paper, coated paper, matte paper, and examples of a recording medium including a plastic film as a base material include a recording medium with a surface of polyvinyl chloride, polyethylene terephthalate, polycarbonate, polystyrene, polyurethane, polyethylene, polypropylene, or the like coated with a hydrophilic polymer or coated with particles of silica, titanium, or the like along with a binder.

Examples of the ink non-absorbable recording medium include a plastic film on which surface processing for ink jet recording has not been performed, that is, on which no ink absorbing layer has been formed, a recording material with a base material such as paper coated with plastic or with a plastic film bonded thereto. Examples of plastic described herein include polyvinyl chloride, polyethylene terephthalate, polycarbonate, polystyrene, polyurethane, polyethylene, polypropylene, and the like.

Here, the "ink low-absorbable or non-absorbable recording medium" in the specification means "a recording medium with a water absorption amount of equal to or less than 10 mL/m$^2$ from start of contact to 30 msec$^{1/2}$ in the Bristow method". The Bristow method is a method that has most widely been distributed as a method of measuring a liquid absorption method in a short time and has also been employed by JAPAN TAPPI. Details of the test method are described in Standard No. 51 "Paper and sheet paper—liquid absorbability test method-Bristow method" in "JAPAN TAPPI paper pulp test method 2000".

Such a recording medium may be a semi-transparent recording medium or a transparent recording medium. In addition, the ink can be preferably used for an ink low-absorbable or non-absorbable recording medium with unevenness on the surface, such as embossed medium.

2. RECORDING METHOD

The recording method according to the embodiment is a recording method using the ink set according to the aforementioned embodiment, and the method includes a process of causing the processing solution that contains a coagulant for coagulating constituents of the ink composition to adhere to a recording medium (processing solution adhesion process), a process of causing the ink composition that includes the light ink composition and the dark ink composition that belong to the same color system and have mutually different color densities to adhere to the recording medium (color ink adhesion process), and a process of causing the clear ink composition that includes the resin to adhere to the recording medium (clear ink adhesion process). Hereinafter, the recording method according to the embodiment will be described by exemplifying an example in which recording is performed using the aforementioned ink jet recording apparatus.

Here, the "region to which the ink composition has been caused to adhere" in the specification means a region to which dots of the ink composition have been caused to adhere.

The "region" referred in the specification represents a portion that occupies a specific area on the recording medium, in which the amount of the ink composition that is caused to adhere to the region is substantially constant. One region is a region that can be visually recognized to have the same color and has an area of equal to or greater than 1 mm$^2$, for example. In addition, substantially constant amount of adhesion means a macroscopic (macro) range in which the region is greater than the area of one dot although the amounts of adhering ink composition differ in a strict sense between a position at which the dot of the ink composition is caused to land and a position at which the dot of the ink composition is not caused to land in a case of a low duty, for example, and macroscopically, the amount of the adhering ink composition is constant in the region, and non-uniformity of the amounts of adhesion depending on whether or not the ink dots are caused to adhere is assumed to be ignored.

In the case of a low duty, a portion where color dots and clear dots do not overlap with each other may be present macroscopically, for example, in liquid droplets (scales of landing dots) in the ink jet method even in a region to which both the color ink and the clear ink have been caused to adhere. However, the presence of the portion where the dots do not overlap when seen in units of dots is regarded as lamination of ink composition macroscopically and is ignored. Therefore, the adhering region described herein will be considered to be a region in which the color ink and the clear ink are laminated in the entire region.

Note that in the specification, the "image" represents a recorded pattern formed by dot groups and includes a printed text and a solid image. Note that the "solid image" means an image pattern, which is obtained by recording dots on all pixels that are minimum recording unit regions defined by recording resolution such that the recording region on the recording medium is typically covered with the ink and the base of the recording medium is not seen.

2.1. Processing Solution Adhesion Process

The processing solution adhesion process is a process of causing the aforementioned processing solution that reacts with the ink composition to adhere to the recording medium. It is possible to improve abrasion resistance and image quality of the obtained printed image by causing the processing solution to adhere to the recording medium.

The processing solution adhesion process may be performed before the adhesion of the ink composition, after the adhesion of the ink composition, or at the same time with the adhesion of the ink composition.

In a case in which the processing solution is caused to adhere before the adhesion of the ink composition or at the same time with the adhesion of the ink composition, the recording medium M is preferably heated with the preheater 7 illustrated in FIG. 1 before the processing solution adhesion process or with the IR heater 3 or the platen heater 4 illustrated in FIG. 1 during the processing solution adhesion process. The processing solution ejected onto the recording medium M tends to be easily spread on the recording medium M by causing the processing solution to adhere to the heated recording medium M, and it is possible to uniformly apply the processing solution. Therefore, the ink that is caused to adhere in a color ink adhesion process, which will be described later, and the processing solution sufficiently react with each other, and excellent image quality is obtained. Since the processing solution is uniformly applied to the recording medium M, it is possible to reduce the amount of application and to prevent abrasion resistance of the obtained image from being degraded.

Here, the surface temperature of the recording medium M when the processing solution is caused to adhere can be set independently from a preferable temperature range of the surface temperature (primary heating temperature) of the recording medium M when the color ink is caused to adhere, which will be described later. For example, the surface temperature of the recording medium M when the processing solution is caused to adhere is preferably equal to or less than 45° C., is more preferably equal to or less than 40° C., and is further preferably equal to or less than 38° C. Also, the lower limit value of the surface temperature of the recording medium M when the processing solution is caused to adhere is preferably equal to or greater than 25° C. and is more preferably equal to or greater than 30° C. In a case in which the surface temperature of the recording medium M when the processing solution is caused to adhere falls within the aforementioned range, it is possible to uniformly apply the processing solution to the recording medium M and to improve abrasion resistance and image quality. Also, it is possible to suppress influences of heat on the ink jet head 2.

Note that the adhesion of the processing solution may be performed through ejection using the ink jet head 2 or by another method such as a method of applying the processing solution with a roll coater, a method of ejecting the processing solution, or the like, for example.

2.2. Color Ink Adhesion Process

The color ink adhesion process is a process of ejecting the aforementioned color ink from the ink jet head 2 and causing the color ink to adhere, and an image of the light ink and the dark ink is formed on the surface of the recording medium M through this process. The region to which the light ink is caused to adhere and the region to which the dark ink is caused to adhere may be different regions in the recording region that is a region in which recording is performed on the recording medium, and/or both the light ink and the dark ink may be caused to adhere to the same region. The recording region has a region to which both the processing solution and the ink composition are caused to adhere. Here, the ink composition includes at least either the light ink or the dark ink.

In the embodiment, the color ink adhesion process includes a process of causing the light ink composition to adhere to the recording medium and a process of causing the dark ink composition to adhere to the recording medium, and the process of causing the light ink composition to adhere to the recording medium and the process of causing the dark ink composition to adhere to the recording medium may or may not be performed at the same time.

The maximum amount of the adhering ink composition per unit area on the recording medium M is preferably equal to or greater than 5 mg/inch$^2$, is more preferably equal to or greater than 7 mg/inch$^2$, and is further preferably equal to or greater than 10 mg/inch$^2$. The upper limit of the amount of the adhering ink composition per unit area of the recording medium is not particularly limited, is preferably equal to or less than 20 mg/inch$^2$, is preferably equal to or less than 18 mg/inch$^2$, and is particularly preferably equal to or less than 16 mg/inch$^2$. Note that the maximum amount of the adhering ink composition is a total amount of the adhering light ink composition and the adhering dark ink composition.

In the recording region on the recording medium M, the recording region to which the processing solution, the light ink composition, the clear ink composition are caused to adhere preferably has an adhesion region in which the amount of the adhering light ink composition is equal to or less than 6 mg/inch$^2$. In the recording region on the recording medium M, the recording region to which the processing solution, the light ink composition, and the clear ink composition are caused to adhere may have an adhesion region in which the amount of the adhering light ink composition is equal to or less than 4 mg/inch$^2$ or an adhesion in which the amount of the adhering light ink composition is equal to or less than 2 mg/inch$^2$. Also, the aforementioned adhesion region may be an adhesion region in which the amount of the adhering light ink composition is equal to or greater than 0.1 mg/inch$^2$ or may be an adhesion region in which the amount of the adhering light ink composition is equal to or greater than 0.5 mg/inch$^2$. Further, the maximum amount of the adhering light ink composition in the recording region to which the processing solution, the light ink composition, and the clear ink composition are caused to adhere is preferably set within the aforementioned range.

The recording region to which the processing solution and the dark ink composition are caused to adhere may have an adhesion region in which the amount of the adhering dark ink composition is greater than 6 mg/inch$^2$. The recording region on the recording medium M may have an adhesion region in which the amount of the adhering dark ink composition is greater than 8 mg/inch$^2$ or may have an adhesion region in which the amount of the adhering dark ink composition is greater than 10 mg/inch$^2$ in the recording region to which the processing solution and the dark ink composition are caused to adhere. The aforementioned adhesion region may be an adhesion region in which the amount of the adhering dark ink composition is equal to or less than 20 mg/inch$^2$ or may be an adhesion region in which the amount of the adhering dark ink composition is equal to or less than 18 mg/inch$^2$. Further, the maximum amount of the adhering dark ink composition in the recording region to which the processing solution, the dark ink composition, and the clear ink composition are caused to adhere is preferably equal to or less than 20 mg/inch$^2$.

In a case in which there is an adhesion region in which the aforementioned amount of adhesion is satisfied, it is possible to record an image with high brightness using the light ink and to record an image with low brightness using the dark ink, which is preferable. Since the clear ink is caused to adhere through the clear ink adhesion process, which will be described later, in the embodiment, it is possible to provide a recording method capable of improving ink filling properties and abrasion properties at the low adhesion portion at which recording is performed only with the light ink, in particular, and achieving excellent abrasion resistance and image quality even in a case in which there is a difference in the amounts of adhering dark ink and adhering light ink as described above. Further, it is possible to reduce a glossiness difference between the low adhesion portion and the intermediate adhesion portion or the high adhesion portion.

The color ink adhesion process may include a heating process of heating the recording medium M with the IR heater 3 or the platen heater 4 before the color ink adhesion process or at the same time with the color ink adhesion process and is preferably performed on the recording medium M heated through the heating process. It is possible to quickly dry the ink on the recording medium M and to suppress bleeding through the heating process. Also, it is possible to form an image with excellent abrasion resistance and image quality.

The upper limit of the surface temperature (primary heating temperature) of the recording medium M when the color ink is caused to adhere is preferably equal to or less than 45° C., is more preferably equal to or less than 40° C., and is further preferably equal to or less than 38° C. If the surface temperature of the recording medium when the ink is caused to adhere falls within the aforementioned range, it is possible to suppress influences of heat on the ink jet head 2 and to prevent clogging of the ink jet head 2 and the nozzles. The lower limit of the surface temperature of the recording medium M during the ink jet recording is preferably equal to or greater than 25° C., is more preferably equal to or greater than 28° C., is further preferably equal to or greater than 30° C., and is particularly preferably equal to or greater than 32° C. If the surface temperature of the recording medium M during the ink jet recording falls within the aforementioned range, it is possible to quickly dry the color ink on the recording medium M, to fix the color ink early, and to form an image with suppressed bleeding and excellent abrasion resistance and image quality.

Serial-Type Recording Method

In the embodiment, the color adhesion process can be performed by a serial-type recording method using a serial-type ink jet head as illustrated in FIG. 2. In the serial-type recording method, recording is performed by alternately repeating main scanning in which the ink jet head ejects the ink and causes the ink to adhere to the recording medium while relatively moving in a main scanning direction of the recording medium and sub scanning in which the recording medium is transported.

In a case of the serial-type recording method, the number of times of main scanning in which a nozzle array used to record a certain composition faces and passes through a certain recording position on the recording medium is referred to as the number of times of main scanning for the composition. The number of times of main scanning is decided for each composition. In a case in which one nozzle array of the second head in FIG. 2 is filled with the ink, and the nozzle array is used for recording, and the distance of the sub scanning performed once is a half distance of the length of the nozzle array in the sub scanning direction, the number of times of main scanning for the ink is two. The number of times of main scanning can increase by reducing the distance of the sub scanning performed once and can decrease by extending the distance. A larger number of times of main scanning is preferable since it is possible to increase the total amount of compositions that are caused to adhere and it is possible to divide the adhesion of the compositions into main scanning performed a plurality of times. Meanwhile, a smaller number of times of main scanning is preferable in terms of a high recording speed. The number of times of main scanning is also referred to as the number of passes.

2.3. Clear Ink Adhesion Process

The clear ink adhesion process is a process of causing the clear ink that includes the aforementioned resin to be ejected from the ink jet head 2 and adhere to the recording medium. More specifically, the clear ink adhesion process is a process of causing the clear ink to adhere to the surface of the recording medium M such that the clear ink partially or entirely overlaps with the region to which the color ink has been caused to adhere to the surface of the recording medium M in the color ink adhesion process. The recording region on the recording medium has a region to which the processing solution, the ink composition (color ink), and the clear ink have been caused to adhere.

In the embodiment, the clear ink adhesion process may be performed at the same time with the color ink adhesion process or after the color ink adhesion process.

In the case of the aforementioned serial-type recording method, performing the clear ink adhesion process after the color ink adhesion process means performing main scanning in which the clear ink is caused to adhere in the recording region on which main scanning has fully been completed twice or more in a case in which the number of times of main scanning for the color ink is two or more.

In the case of the serial-type recording method, "performing the color ink adhesion process at the same time with the color ink adhesion process" means causing the color ink and the clear ink at certain positions on the recording medium through main scanning that is the same as the main scanning for the color ink.

Note that even in a case in which the aforementioned processing solution adhesion process is performed before the adhesion of the ink composition, after the adhesion of the ink composition, or at the same time with the adhesion of the ink composition, the processes are similarly performed for the processing solution and the ink composition.

In a case in which the clear ink adhesion process is performed after the color ink adhesion process, the clear ink adhesion process may be a process of overcoating the clear ink on the image formed with the color ink on the recording medium M such that the clear ink partially or entirely overlaps with the region to which the color ink has been caused to adhere.

In the case in which the clear ink is caused to adhere to the recording medium such that the clear ink partially or entirely overlaps with the region to which the color ink has been caused to adhere, it is only necessary for the clear ink to be caused to adhere such that the clear ink overlaps with at least a part of the region to which the color ink has been caused to adhere. Specifically, the clear ink is preferably caused to adhere such that the clear ink overlaps with 50% or more of the region to which at least the light ink in the color ink has been caused to adhere, is more preferably caused to adhere such that the clear ink overlaps with 60% or more of the region, and is further preferably caused to adhere such that the clear ink overlaps with 70% or more. Further, the clear ink is caused to adhere such that the clear ink overlaps with 50% or more of the region to which the dark ink has been caused to adhere, is more preferably caused to adhere such that the clear ink overlaps with 60% or more of the region, and is further preferably caused to adhere such that the clear ink overlaps with 70% or more of the region. It is possible to provide a recording method capable of improving ink filling properties and abrasion resistance and achieving excellent abrasion resistance and image quality by causing the clear ink to adhere in this manner and compensating for the resin included in the clear ink at the low adhesion portion recorded only with the light ink.

Figure 3:
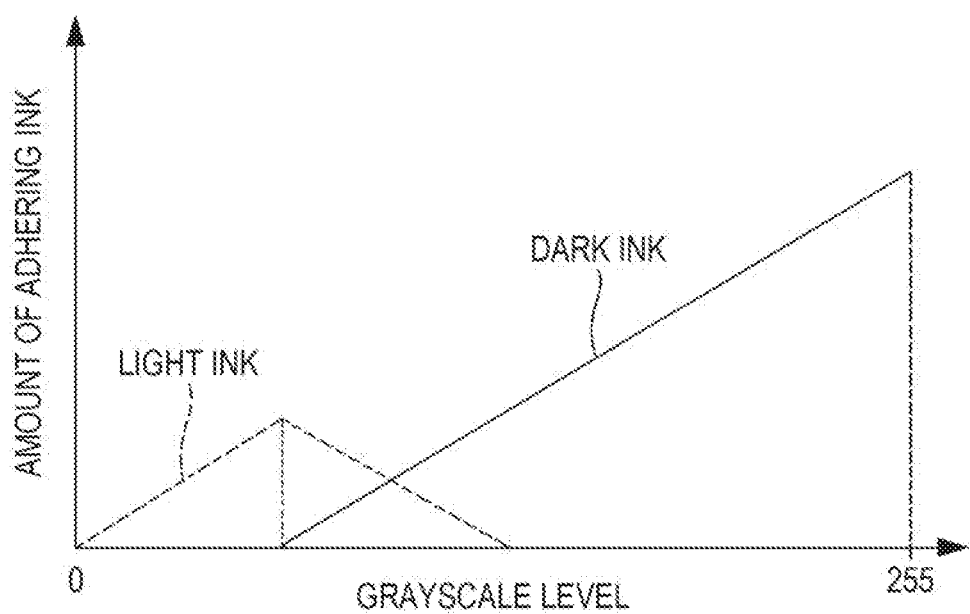
FIG. 3 is a diagram illustrating a relationship between a grayscale level and an amount of the adhering ink when an image is formed using dark and light ink.

FIG. 3 illustrates a relationship between a grayscale level of an image and the amount of the adhering ink when the image is formed using the dark and light ink. As illustrated in FIG. 2, the region with a low grayscale level is a low adhesion portion in which a small amount of ink has been caused to adhere using only the light ink. Meanwhile, the region with an intermediate grayscale level is an intermediate adhesion portion to which the ink has been caused to adhere using both the light ink and the dark ink, and the following region with a high grayscale level is a high adhesion region in which a large amount of ink has been caused to adhere using only the dark ink.

As illustrated in FIG. 2, since the amount of the adhering ink is small in the region in which the light ink is used and the grayscale level is low, the absolute amount of the adhering fine resin particles in the ink becomes small, and abrasion resistance tends to be low. If the processing solution is used to improve image quality in a case in which the light ink is used to perform recording on an ink low-absorbable recording medium or a non-absorbable recording medium, degradation of abrasion resistance and wet friction resistance is reduced while ink dots do not spread, become small, and leads to unsatisfactory filling of the light ink. Therefore, image quality at the low adhesion portion using the light ink tends to be degraded, it becomes difficult to smooth the ink due to the processing solution, and abrasion resistance tends to be degraded. Further, since the ink is caused to sparsely adhere to the low adhesion region, the image becomes matte, low glossiness is obtained, and a glossiness difference with the intermediate adhesion portion and the high adhesion portion tends to be noticeable.

In contrast, according to the recording method of the embodiment, it is possible to fill gaps of dots of the light ink by using the clear ink, wet the gap with the ink droplets, and achieve satisfactory filling properties at a low adhesion portion, in particular, by including the clear ink adhesion process. Also, it is possible to increase the amount of resin adhering to the low adhesion portion and to increase abrasion properties at the low adhesion portion by using the clear ink. Further, it is possible to reduce a glossiness difference between the low adhesion portion and the high adhesion portion by increasing the amount of resin adhering to the low adhesion portion. In this manner, it is possible to secure abrasion resistance and image quality at the low adhesion portion and further to reduce a glossiness difference with the intermediate adhesion portion and the high adhesion portion in recording using the dark and light ink and the processing solution in the recording method according to the embodiment.

The recording region on the recording medium M preferably has a region in which the amount of the adhering clear ink composition is equal to or greater than 1 mg/inch$^2$, further preferably has a region in which the amount is equal to or greater than 2 mg/inch$^2$, and is more preferably equal to or greater than 3 mg/inch$^2$ in the recording region to which the processing solution, the light ink composition, and the clear ink composition are caused to adhere. Also, the recording region on the recording medium M preferably has a region in which the amount of the adhering clear ink composition is equal to or less than 6 mg/inch$^2$, further preferably has a region in which the amount is equal to or greater than 5 mg/inch$^2$, and more preferably has a region in which the amount is equal to or greater than 4 mg/inch$^2$ in the recording region to which the processing solution, the light ink composition, and the clear ink composition are caused to adhere. If the amount of the adhering clear ink composition falls within the aforementioned range, it is possible to secure abrasion resistance and image quality at the low adhesion portion and further to reduce a glossiness difference with the intermediate adhesion portion and the high adhesion portion.

The clear ink adhesion process may include a heating process of heating the recording medium M with the IR heater 3 and the platen heater 4 after the color ink adhesion process or at the same time with the color ink adhesion process and is preferably performed on the recording medium M heated through the heating process. In this manner, it is possible to quickly dry the clear ink on the recording medium M and to form an image with excellent abrasion resistance and image quality.

The temperature in the heating process can be set independently from the preferable temperature range of the surface temperature (primary heating temperature) of the recording medium M at the time of the aforementioned color ink adhesion process, and the upper limit of the surface temperature of the recording medium M when the clear ink is caused to adhere is preferably equal to or less than 45° C., is more preferably equal to or less than 40° C., and is further preferably equal to or less than 38° C. If the surface temperature of the recording medium when the ink is caused to adhere falls within the aforementioned range, it is possible to suppress influences of heat on the ink jet head 2 and to prevent clogging of the ink jet head 2 and the nozzles. The lower limit of the surface temperature of the recording medium M during the ink jet recording is preferably equal to or greater than 25° C., is more preferably equal to or greater than 28° C., and is further preferably equal to or greater than 30° C., and is particularly preferably equal to or greater than 32° C. If the surface temperature of the recording medium M during the ink jet recording falls within the aforementioned range, it is possible to quickly dry the clear ink on the recording medium M.

2.4. Secondary Heating Process

The recording method according to the embodiment may have a secondary heating process (also referred to as a "post-heating process") of heating the recording medium M, to which the ink composition has been caused to adhere, with the hardening heater 5 illustrated in FIG. 1 after the aforementioned color ink adhesion process and the clear ink adhesion process. In this manner, the resin or the like included in the ink composition on the recording medium M is melted to form an ink film, and the ink film is firmly fixed to the recording medium M, thereby achieving excellent film formation properties and obtaining an image with excellent abrasion resistance and high image quality in a short time.

The upper limit of the surface temperature of the recording medium M heated with the hardening heater 5 is preferably equal to or less than 120° C., is more preferably equal to or less than 110° C., and is more preferably equal to or less than 100° C. Also, the lower limit of the surface temperature of the recording medium M is preferably equal to or greater than 60° C., is more preferably equal to or greater than 70° C., and is more preferably equal to or greater than 80° C. If the temperature falls within the aforementioned range, it is possible to secure clogging resistance and to obtain an image with excellent abrasion resistance and high image quality in a short time.

Note that a process of cooling the ink composition on the recording medium M with the cooling fan 6 illustrated in FIG. 1 may be provided after the secondary heating process.

2.5. Other Processes

The recording method according to the embodiment may include a cleaning process of causing the ink composition and the processing solution to be discharged with a mechanism other than a pressure generation mechanism for ejecting and recording the ink, that is, a mechanism other than the mechanism that is provided in the ink jet head 2 to eject the ink for recording.

Examples of the mechanism provided in the ink jet head 2 to eject the ink for recording includes a piezoelectric element that is provided in a pressure chamber (not illustrated) and applies a pressure to the ink and a heater element. The cleaning process may be a process of applying a pressure from the outside to the ink jet head 2 and causing the nozzles to discharge the ink composition and the processing solution. It is possible to suppress a concern that resin is welded to an inner wall of the ink jet head 2 and to achieve further excellent ejection stability even in a case in which there is such a concern, by including this process.

Note that examples of another mechanism described above include a pressure application mechanism of applying a negative pressure (suctioning) or a positive pressure from the upstream of the ink jet head. Such a mechanism is not ink discharge (flushing) with a function of the ink jet head itself. That is, this mechanism is not discharge using the function of causing the ink jet head to eject the ink for recording.

As described above, according to the recording method of the embodiment, it is possible to provide a recording method capable of achieving excellent abrasion resistance and image quality even in a low ink adhesion region in which a grayscale level is low, in particular, and reducing a glossiness difference between the intermediate adhesion region and the high adhesion region by including the clear adhesion process in the recording using the dark and light ink and the processing solution.

3. EXAMPLES

Hereinafter, the embodiment of the invention will be specifically described with reference to examples and comparative examples. However, the embodiment is not limited only to these examples.

3.1. Preparation of Ink and Processing Solution

The respective constituents were mixed and stirred such that blending rates described in Table 1 were obtained. Note that as the pigment, a pigment dispersion was prepared by mixing a pigment and a dispersant resin described below in water in advance and stirring the pigment and the dispersant resin with a bead mill, and the prepared pigment dispersion was used. After the stirring, the mixture was filtered with a membrane filter with a pore size of 5 μm, and dark ink 1 and 2, light ink 1 to 6, clear ink 1 to 4, and processing solutions 1 to 3 are obtained. All the numerical values in Table 1 are values in terms of % by mass, and water was added such that the total mass of the ink became 100% by mass. Also, values in terms of solid content are represented for the pigment and the resin.

TABLE 1

| | | Boiling point of solvent (° C.) | Dark ink 1 | Dark ink 2 | Light ink 1 | Light ink 2 | Light ink 3 | Light ink 4 | Light ink 5 | Light ink 6 |
|---|---|---|---|---|---|---|---|---|---|---|
| Coagulant | Magnesium sulfate heptahydrate | | — | — | — | — | — | — | — | — |
| | JETFIX 260 | | — | — | — | — | — | — | — | — |
| | Malonic acid | | | | | | | | | |
| Coloring material | Pigment Blue 15:3 | | 4 | 4 | 0.5 | 0.5 | 0.5 | 0.5 | 0.5 | 0.5 |
| Resin | Styrene acrylic resin A | | 5 | | 5 | | | 5 | 5 | 7 |
| | Styrene acrylic resin B | | | | | 5 | | | | |
| | Urethane resin | | | 5 | | | 5 | | | |
| Solvent | 2-pyrrolidone | 245 | 15 | 15 | 20 | 20 | 20 | 10 | 20 | 20 |
| | 3-methoxy-N,N-dymethylpropaneamide | 215 | | | | | | 10 | | |
| | Propylene glycol | 189 | 10 | 10 | 15 | 15 | 15 | 15 | 14 | 15 |
| | 1,3-butylene glycol | 208 | | | 2 | 2 | 2 | 2 | 2 | 2 |
| | Glycerin | 290 | | | | | | | 1 | |
| Activator | Siloxane-based surfactant | | 1 | 1 | 1 | 1 | 1 | 1 | 1 | 1 |
| | Water | | Residual | Residual | Residual | Residual | Residual | Residual | Residual | Residual |
| | Total | | 100 | 100 | 100 | 100 | 100 | 100 | 100 | 100 |

| | | Boiling point of solvent (° C.) | Clear 1 | Clear 2 | Clear 3 | Clear 4 | Processing solution 1 | Processing solution 2 | Processing solution 3 |
|---|---|---|---|---|---|---|---|---|---|
| Coagulant | Magnesium sulfate heptahydrate | | — | — | — | — | 6.6 | | |
| | JETFIX 260 | | — | — | — | — | | 5.5 | — |
| | Malonic acid | | | | | | | | 6.5 |
| Coloring material | Pigment Blue 15:3 | | — | — | — | — | — | — | — |
| Resin | Styrene acrylic resin A | | 7 | | | 7 | — | — | — |
| | Styrene acrylic resin B | | | 7 | | | | | |
| | Urethane resin | | | | 7 | | | | |
| Solvent | 2-pyrrolidone | 245 | 15 | 15 | 15 | 7 | 20 | 20 | 20 |
| | 3-methoxy-N,N-dymethylpropaneamide | 215 | | | | 8 | | | |
| | Propylene glycol | 189 | 10 | 10 | 10 | 10 | 15 | 15 | 15 |
| | 1,3-butylene glycol | 208 | 2 | 2 | 2 | 2 | 2 | 2 | 2 |
| | Glycerin | 290 | | | | | | | |
| Activator | Siloxane-based surfactant | | 1 | 1 | 1 | 1 | 1 | 1 | 1 |
| | Water | | Residual | Residual | Residual | Residual | Residual | Residual | Residual |
| | Total | | 100 | 100 | 100 | 100 | 100 | 100 | 100 |

Details of substances described in Table 1 were as follows.

Coagulant
Polyvalent metal salt: magnesium sulfate heptahydrate
Cationic resin: JETFIX 260 (name of product manufactured by Satoda Chemical Industrial Co., Ltd.; Amine-based resin)
Organic acid: malonic acid
Coloring Material
Cyan pigment: C.I. Pigment Blue 15:3 pigment dispersion, content of pigment: 15% by mass, content of anionic dispersant resin: 3.75% by mass
Resin
Styrene acrylic resin A: styrene-acrylic acid copolymer emulsion (40% dispersion) prepared by styrene acrylic resin with an acid value of 0 mgKOH/g and emulsifying it with an emulsifier
Styrene acrylic resin B: styrene-acrylic acid copolymer emulsion (40% dispersion) prepared by styrene acrylic resin with an acid value of 20 mgKOH/g and emulsifying it with an emulsifier
Urethane resin: self-emulsified urethane resin emulsion of anionic polycarbonate-based urethane (35% dispersion)
Surfactant
Siloxane-based surfactant: BYK348 (name of product manufactured by BYK Additives & Instruments)

3.2. Evaluation of Reactivity of Resin

Resin solutions obtained by dispersing the aforementioned three kinds of resin in water (resin emulsions) were diluted with pure water such that the concentration of the solid content thereof was 1% by mass. In an environment at 25° C., volume average particle diameters (D50) when the resin solutions were stirred with a processing solution of 0.3 M magnesium sulfate at a mass ratio of 1:1 for 1 minute were checked. As a result, increases in the volume average particle diameters were about 1.2 times for the styrene acrylic resin A and over 5 times for the styrene acrylic resin B and the urethane resin.

3.3. Evaluation of Ink Set and Recording Method

Next, evaluation tests were conducted using the ink and the processing solutions described in Table 1.

3.3.1. Image Formation

A modified machine of an ink jet printer (name of product "SC-S40650" manufactured by Seiko Epson Corporation) was prepared, three heads of the ink jet printer were assumed to be first to third heads in the order from the upstream side to the downstream side in the transport direction of a recording medium as illustrated in FIG. 3. A configuration including a platen heater at a shared platen that faced the first to third heads and including a secondary dryer furnace on the downstream of the heads was employed. Temperatures of the heater and the secondary dryer furnace were able to be adjusted. As the recording medium, polyvinyl chloride films for indoor and outdoor signs (name of product "IJ180-10" manufactured by 3M Japan Limited) were used.

One nozzle array of the first head was filled with a processing solution, each nozzle array of the second head was filled with the dark ink or the light ink, and one nozzle array of the third head was filled with the clear ink in accordance with combinations described in Tables 2 to 4. The maximum resolution was set to 1440×1400 dpi for each ink and each processing solution, and the amounts of ink and the densities of dots were adjusted such that the amounts of adhesion were set to the values in the tables. Note that the number of times of main scanning was set to eight for the respective compositions.

The processing solution, the dark and light ink, and the clear ink were recorded on the recording medium such that they overlaid on test patterns in this order. However, different patterns were formed with the dark and light ink although the dark and light ink was recorded at the same time. Note that the second head was filled with the processing solution and the processing solution and the dark and light ink were caused to adhere at the same time in the example in which the dark and light ink was recorded at the same time as the adhesion method of the processing solution in the table. Also, the second head was filled with the clear ink and the clear ink and the dark and light ink were caused to adhere at the same time in the example in which the dark and light ink was recorded at the same time as the adhesion method of the clear ink.

The recording medium was heated with the platen heater at the time of the adhesion of the ink, and secondary drying (post-drying) was performed with a secondary dryer furnace after the adhesion of the ink. The surface temperatures of the recording medium at the time of the adhesion of the ink and at the time of the secondary drying were set to the values in the tables.

TABLE 2

| | | | Example 1 | Example 2 | Example 3 | Example 4 | Example 5 |
|---|---|---|---|---|---|---|---|
| Ink set configuration | Processing solution | | Processing solution 1 | Processing solution 1 | Processing solution 1 | Processing solution 1 | Processing solution 1 |
| | Dark ink | | Dark ink 1 | Dark ink 1 | Dark ink 1 | Dark ink 1 | Dark ink 1 |
| | Light ink | | Light ink 1 | Light ink 2 | Light ink 3 | Light ink 4 | Light ink 5 |
| | Clear ink | | Clear 1 | Clear 1 | Clear 1 | Clear 1 | Clear 1 |
| Amount of adhering processing solution (with respect to mass % of ink) (With respect to dark ink; with respect to light ink) | | | 10%   10% | 10%   10% | 10%   10% | 10%   10% | 10%   10% |
| Amount of adhering ink (mg/inch$^2$) | Dark ink | | 12 | 12 | 12 | 12 | 12 |
| | Light ink | | 2 | 2 | 2 | 2 | 2 |
| | Clear | | 2   2 | 2   2 | 2   2 | 2   2 | 2   2 |
| Temperature of recording medium during adhesion of ink (° C.) | | | 35 | 35 | 35 | 35 | 35 |
| Temperature of recording medium during secondary drying (° C.) | | | 80 | 80 | 80 | 80 | 80 |
| Adhesion method of processing solution | | | Before dark and light ink | Before dark and light ink | Before dark and light ink | Before dark and light ink | Before dark and light ink |
| Adhesion method of clear ink | | | After dark and light ink | After dark and light ink | After dark and light ink | After dark and light ink | After dark and light ink |
| Evaluation | Image quality | | A   B | A   A | A   A | A   B | A   B |
| | Abrasion resistance | | A   B | A   C | A   A | A   A | A   C |

TABLE 2-continued

|  |  | | | | | | | | | | | | | | | | | | |
|---|---|---|---|---|---|---|---|---|---|---|---|---|---|---|---|---|---|---|---|
| Wet friction resistance | | B | | B | | B | A | B | A | B | | B | | B | | B | C | | |
| Glossiness | | A | | | | B | | | A | | | A | | | A | | | | |
| Clogging resistance (Dark ink; Light ink) | | B | A | B | | B | B | B | A | B | | B | | B | | B | A | | |

|  |  | Example 6 | Example 7 | Example 8 | Example 9 | Example 10 |
|---|---|---|---|---|---|---|
| Ink set configuration | Processing solution | Processing solution 1 | Processing solution 1 | Processing solution 1 | Processing solution 1 | Processing solution 1 |
|  | Dark ink | Dark ink 1 | Dark ink 1 | Dark ink 1 | Dark ink 1 | Dark ink 2 |
|  | Light ink | Light ink 6 | Light ink 1 | Light ink 1 | Light ink 1 | Light ink 1 |
|  | Clear ink | Clear 1 | Clear 2 | Clear 3 | Clear 4 | Clear 1 |
| Amount of adhering processing solution (with respect to mass % of ink) (With respect to dark ink; with respect to light ink) |  | 10%  10% | 10%  10% | 10%  10% | 10%  10% | 10%  10% |
| Amount of adhering ink (mg/inch$^2$) | Dark ink | 12 | 12 | 12 | 12 | 12 |
|  | Light ink | 2 | 2 | 2 | 2 | 2 |
|  | Clear | 2  2 | 2  2 | 2  2 | 2  2 | 2  2 |
| Temperature of recording medium during adhesion of ink (° C.) |  | 35 | 35 | 35 | 35 | 35 |
| Temperature of recording medium during secondary drying (° C.) |  | 80 | 80 | 80 | 80 | 80 |
| Adhesion method of processing solution |  | Before dark and light ink | Before dark and light ink | Before dark and light ink | Before dark and light ink | Before dark and light ink |
| Adhesion method of clear ink |  | After dark and light ink | After dark and light ink | After dark and light ink | After dark and light ink | After dark and light ink |
| Evaluation | Image quality | A  B | A  B | A  B | A  B | A  B |
|  | Abrasion resistance | A  A | A  C | A  A | A  A | A  B |
|  | Wet friction resistance | B  B | B  A | B  A | B  B | A  B |
|  | Glossiness | A | B | A | A | A |
|  | Clogging resistance (Dark ink; Light ink) | B  B | B  A | B  A | B  A | B  A |

TABLE 3

|  |  | Example 11 | Example 12 | Example 13 | Example 14 | Example 15 |
|---|---|---|---|---|---|---|
| Ink set configuration | Processing solution | Processing solution 2 | Processing solution 3 | Processing solution 1 | Processing solution 1 | Processing solution 1 |
|  | Dark ink | Dark ink 1 | Dark ink 1 | Dark ink 1 | Dark ink 1 | Dark ink 1 |
|  | Light ink | Light ink 1 | Light ink 1 | Light ink 1 | Light ink 1 | Light ink 1 |
|  | Clear ink | Clear 1 | Clear 1 | Clear 1 | Clear 1 | Clear 1 |
| Amount of adhering processing solution (with respect to mass % of ink) (With respect to dark ink; with respect to light ink) |  | 10%  10% | 10%  10% | 10%  10% | 10%  10% | 10%  10% |
| Amount of adhering ink (mg/inch$^2$) | Dark ink | 12 | 12 | 12 | 12 | 15 |
|  | Light ink | 2 | 2 | 2 | 2 | 5 |
|  | Clear | 2  2 | 2  2 | 2  2 | 2  2 | 2  2 |
| Temperature of recording medium during adhesion of ink (° C.) |  | 35 | 35 | 40 | 35 | 35 |
| Temperature of recording medium during secondary drying (° C.) |  | 80 | 80 | 80 | 70 | 80 |
| Adhesion method of processing solution |  | Before dark and light ink | Before dark and light ink | Before dark and light ink | Before dark and light ink | Before dark and light ink |
| Adhesion method of clear ink |  | After dark and light ink | After dark and light ink | After dark and light ink | After dark and light ink | After dark and light ink |
| Evaluation | Image quality | B  B | B  B | A  A | A  B | B  A |
|  | Abrasion resistance | A  A | A  B | A  B | B  B | A  A |
|  | Wet friction resistance | A  A | B  C | B  B | C  C | B  B |
|  | Glossiness | A | A | B | A | B |
|  | Clogging resistance (Dark ink; Light ink) | B  A | B  A | C  B | B  A | B  A |

|  |  | Example 16 | Example 17 | Example 18 | Example 19 | Example 20 |
|---|---|---|---|---|---|---|
| Ink set configuration | Processing solution | Processing solution 1 | Processing solution 1 | Processing solution 1 | Processing solution 1 | Processing solution 1 |
|  | Dark ink | Dark ink 1 | Dark ink 1 | Dark ink 1 | Dark ink 1 | Dark ink 1 |
|  | Light ink | Light ink 1 | Light ink 1 | Light ink 1 | Light ink 1 | Light ink 1 |
|  | Clear ink | Clear 1 | Clear 1 | Clear 1 | Clear 1 | Clear 1 |
| Amount of adhering processing solution (with respect to mass % of ink) (With respect to dark ink; with respect to light ink) |  | 30%  30% | 5%  5% | 10%  10% | 10%  10% | 10%  10% |

TABLE 3-continued

| | | | | | | | | | | |
|---|---|---|---|---|---|---|---|---|---|---|
| Amount of adhering ink (mg/inch²) | Dark ink | 12 | | 12 | | 12 | | 12 | | 12 | |
| | Light ink | | 2 | | 2 | | 2 | | 2 | | 2 |
| | Clear | 2 | 2 | 2 | 2 | 5 | 5 | 2 | 2 | 2 | 2 |
| Temperature of recording medium during adhesion of ink (° C.) | | 35 | | 35 | | 35 | | 35 | | 35 | |
| Temperature of recording medium during secondary drying (° C.) | | 80 | | 80 | | 80 | | 80 | | 80 | |
| Adhesion method of processing solution | | Before dark and light ink | | Before dark and light ink | | Before dark and light ink | | At the same time with dark and light ink | | Before dark and light ink | |
| Adhesion method of clear ink | | After dark and light ink | | After dark and light ink | | After dark and light ink | | After dark and light ink | | At the same time with dark and light ink | |
| Evaluation | Image quality | A | A | B | B | B | B | B | B | A | B |
| | Abrasion resistance | B | C | A | B | A | A | A | B | B | C |
| | Wet friction resistance | C | C | A | A | B | B | B | B | B | B |
| | Glossiness | | B | | A | | A | | A | | B | |
| | Clogging resistance (Dark ink; Light ink) | B | B | A | A | B | A | C | B | B | A |

TABLE 4

| | | Example 21 | | Comparative Example 1 | | Comparative Example 2 | | Comparative Example 3 | | Reference Example | |
|---|---|---|---|---|---|---|---|---|---|---|---|
| Ink set configuration | Processing solution | Processing solution 1 | | Processing solution 1 | | — | | — | | Processing solution 1 | |
| | Dark ink | Dark ink 1 | | Dark ink 1 | | Dark ink 1 | | Dark ink 1 | | Dark ink 1 | |
| | Light ink | Light ink 1 | | Light ink 1 | | Light ink 1 | | Light ink 1 | | Light ink 1 | |
| | Clear ink | Clear 1 | | — | | Clear 1 | | — | | — | |
| Amount of adhering processing solution (with respect to mass % of ink) (With respect to dark ink; with respect to light ink) | | 10% | 10% | 10% | 10% | 10% | 10% | 10% | 10% | 10% | 10% |
| Amount of adhering ink (mg/inch²) | Dark ink | 12 | | 12 | | 12 | | 12 | | 12 | |
| | Light ink | | 2 | | 2 | | 2 | | 2 | | 12 |
| | Clear | | 2 | | — | 2 | 2 | | — | | — |
| Temperature of recording medium during adhesion of ink (° C.) | | 35 | | 35 | | 35 | | 35 | | 35 | |
| Temperature of recording medium during secondary drying (° C.) | | 80 | | 80 | | 80 | | 80 | | 80 | |
| Adhesion method of processing solution | | Before dark and light ink | | Before dark and light ink | | Before dark and light ink | | Before dark and light ink | | Before dark and light ink | |
| Adhesion method of clear ink | | After dark and light ink | | After dark and light ink | | After dark and light ink | | After dark and light ink | | After dark and light ink | |
| Evaluation | Image quality | A | B | A | B | C | C | C | C | A | C |
| | Abrasion resistance | B | B | B | D | A | A | A | C | B | B |
| | Wet friction resistance | B | B | B | D | A | A | A | B | B | B |
| | Glossiness | | A | | C | | A | | A | | A | |
| | Clogging resistance (Dark ink; Light ink) | B | A | B | A | A | A | A | A | B | A |

3.3.2. Evaluation of Image Quality

The test patterns obtained in 3.3.1. Image Formation were visually determined, and evaluation on the basis of the following criteria was performed.
Evaluation Criteria
A: No variations were observed in density in the pattern.
B: Small variations were slightly observed in density in the pattern.
C: Large and noticeable variations were observed in the pattern.

3.3.3. Evaluation of Abrasion Resistance

Abrasion resistance of the test patterns obtained in 3.3.1. Image Formation was evaluated using an abrasion resistance/wet friction resistance: JSPS-type fastness-to-friction tester AB-301 (name of product manufactured by Tester Sangyo Co., Ltd.). Specifically, the surface of the recording medium on which an image was recorded with rubbed over ten round trips with a friction element with white cotton cloth (in accordance with JIS L 0803) attached thereto while a load of 500 g was applied thereto. Then, how the image (coated film) was peeled off from the surface of the recording medium was visually observed and was evaluated on the basis of the following criteria.
Evaluation Criteria
A: Neither peeling of the pattern portion nor color staining on the cotton cloth were observed.
B: No peeling of the pattern portion was observed while color staining on the cotton cloth was slightly observed.
C: Peeling of the pattern portion was within 10% of the rubbed area.
D: Peeling of the pattern portion was greater than 10% of the rubbed area.

3.3.4. Evaluation of Wet Friction Resistance

A cotton cloth dipped into water and then squeezed was used instead of the friction element in 3.3.3. Evaluation of Abrasion Resistance, the surface of the recording medium was rubbed over ten round rips while a load of 200 g was applied thereto, and how the image (coated film) was peeled from the surface of the recording medium was visually observed and evaluated on the basis of the following criteria.

Evaluation Criteria
A: Neither peeling of the pattern portion nor color staining on the cotton cloth were observed.
B: No peeling of the pattern portion was observed while color staining on the cotton cloth was slightly observed.
C: Peeling of the pattern portion was within 10% of the rubbed area.
D: Peeling of the pattern portion was greater than 10% of the rubbed area.

3.3.5. Evaluation of Glossiness Difference

The test patterns obtained in 3.3.1. Image Formation were placed obliquely such that fluorescent light was reflected, and glossiness in the dark ink pattern portion and glossiness in the light ink pattern portion were visually compared and were evaluated on the basis of the following criteria.

Evaluation Criteria
A: No glossiness difference was observed between the patterns.
B: A slight glossiness difference was observed between the patterns.
C: A noticeable glossiness difference was observed between the patterns.

3.3.6. Evaluation of Clogging Resistance

Image recording was successively performed for 2 hours under the conditions of the image formation, and the nozzle array (360 nozzles) of the dark ink and the light ink after the recording was inspected and was evaluated on the basis of the following criteria.

Evaluation Criteria
A: There were no nozzles that did not eject ink.
B: The rate of nozzles that did not eject ink was equal to or less than 2%.
C: The rate of nozzles that did not eject ink was greater than 2% and equal to or less than 4%.
D: The rate of nozzles that did not eject ink was greater than 4%.

3.4. Evaluation Results

Results of the evaluation tests are shown in Tables 2 to 4.

Excellent image quality and abrasion resistance were achieved in all the examples using the processing solution, the dark ink, the light ink, and the clear ink. Meanwhile, either of image quality or abrasion resistance was inferior in comparative examples that did not use them. Details will be described below.

In comparison between Examples 1 and 2, image quality and wet friction resistance were more excellent as reactivity of the resin included in the light ink was higher while abrasion resistance, a glossiness difference, and clogging resistance were more excellent as reactivity of the resin included in the light ink was lower.

In Examples 1 to 3, abrasion resistance, a glossiness difference, and clogging resistance were excellent even if reactivity of the resin was high if urethan resin was used as the resin included in the light ink.

In comparison between Examples 1 and 6, abrasion resistance increases while nozzle clogging slightly occurs if the amount of resin included in the light ink increases.

In comparison between Examples 1 and 4, the resin on the recording medium was dissolved and the abrasion resistance was thus improved while nozzle clogging slightly occurs if the light ink included alkoxy alkyl amides as the nitrogen-containing solvent.

In comparison between Examples 1 and 5, abrasion resistance and wet friction resistance were degraded if the light ink included a high-boiling-point solvent.

In comparison between Examples 1 and 7, wet friction resistance was excellent while abrasion resistance and a glossiness difference were degraded if the reactivity of the resin included in the clear ink was high.

Meanwhile, in Examples 1, 7, and 8, abrasion resistance and a glossiness difference were excellent regardless of high reactivity of the resin if urethane resin was used as the resin included in the clear ink.

In comparison between Examples 1 and 9, the resin on the recording medium was dissolved, and abrasion resistance was thus improved if the clear ink included alkoxy alkyl amides as the nitrogen-containing solvent.

In comparison between Examples 1 and 10, wet friction resistance was improved if urethane resin was used as the resin included in the dark ink.

In Examples 1, 11, and 12, as for the coagulant included in the processing solution, more excellent image quality was obtained in the image using the dark ink if a polyvalent metal salt was used while more excellent abrasion resistance and wet friction resistance were obtained if cationic resin was used as the coagulant.

In Examples 1, 13, and 14, a glossiness difference and clogging resistance were more excellent as the temperature when the processing solution and the ink were caused to adhere was lower. Meanwhile, the resin was more sufficiently melted and formed a film on the recording medium as the temperature of the secondary drying was higher, this was resulted in high abrasion resistance and wet friction resistance.

In comparison between Examples 1 and 15, image quality and abrasion resistance of the light ink were more excellent as the amount of the adhering ink was larger while abrasion resistance and wet friction resistance were slightly degraded and a glossiness difference was slightly degraded in the case of the dark ink.

In Examples 1, 16, and 17, image quality of the light ink was more excellent as the amount of the adhering processing solution was larger while abrasion resistance, wet friction resistance, a glossiness difference, and clogging resistance were more excellent as the amount of the adhering processing solution was smaller.

In comparison between Examples 1 and 18, image quality of the dark ink was more excellent as the amount of the adhering clear ink was smaller while abrasion resistance of the light ink was higher as the amount of the adhering clear ink was larger.

In Comparison between Examples 1 and 19, image quality of the dark ink and the clogging resistance of the dark and light ink were degraded if the processing solution and the dark and light ink were caused to adhere at the same time.

Meanwhile, in comparison between Examples 1 and 20, abrasion resistance and a glossiness difference were degraded if the clear ink and the dark and light ink were caused to adhere at the same time.

Comparison between Examples 1 and 21 indicates that abrasion resistance was further improved if the clear ink was caused to adhere on the dark ink while no problem occurs if the amount of the adhering clear ink was smaller than that of the light ink.

In contrast with these examples, abrasion resistance and wet friction resistance of the light ink, in particular, were inferior since no clear ink was caused to adhere, and this resulted in a noticeable difference in glossiness between the patterns in Comparative Example 1.

In Comparative Examples 2 and 3, the processing solution was not caused to adhere, this resulted in inferior image quality. In Comparative Example 3, slightly satisfactory abrasion resistance was obtained as compared with Comparative Example 1 regardless of no use of the clear ink. It was found out from this result that clear ink was necessary to obtain excellent abrasion resistance in the case in which the processing solution was used.

In Reference Example, satisfactory abrasion resistance and wet friction resistance were obtained regardless of no use of the clear ink while image quality of the light ink was inferior in the case in which the amount of the adhering light ink was large. It was found out that image quality was inferior in the case in which the large amount of light ink was used and caused to adhere. This was estimated to be because the content of constituents coagulated by the processing solution, such as a pigment, was small.

On the basis of the aforementioned results, not only excellent image quality and abrasion resistance but also satisfactory results of clogging resistance were achieved by using the clear ink in the recording using the ink composition including the light ink composition and the dark ink composition with the processing solution in combination in all the examples.

The invention is not limited to the aforementioned embodiment, and various modifications can be made. For example, the invention includes configurations that are substantially the same (for example, configurations with the same functions, methods, and results or configurations with the same purposes and advantages) as the configuration described in the embodiment. Also, the invention includes configurations in which portions that are not essential in the configuration described in the embodiment are replaced. Also, the invention includes configurations with which effects and advantages that are same as those of the configuration described in the embodiment can be obtained or configurations with which the same purposes can be achieved. In addition, the invention includes configurations in which known techniques are added to the configuration described in the embodiment.

The entire disclosure of Japanese Patent Application No. 2018-049354, filed Mar. 16, 2018 is expressly incorporated by reference herein.

What is claimed is:

1. A recording method comprising:
    causing a processing solution that contains a coagulant for coagulating constituents of an ink composition to adhere to a recording medium;
    causing an ink composition that includes a light ink composition and a dark ink composition that belong to a same color system and have mutually different color densities to adhere to the recording medium; and
    causing a clear ink composition that includes resin to adhere to the recording medium,
    wherein a region in which an amount of the adhering light ink composition is equal to or less than 6 mg/inch$^2$ is included in a region, to which the processing solution, the light ink composition, and the clear ink composition are caused to adhere, on the recording medium, and
    a region in which an amount of the adhering dark ink composition is greater than 6 mg/inch$^2$ is included in a region, to which the processing solution and the dark ink composition are caused to adhere.

2. An ink set that is used in the recording method according to claim 1, the ink set comprising:
    the ink composition that includes the light ink composition and the dark ink composition; and
    the clear ink composition.

3. The recording method according to claim 1, wherein a content of the resin included in the clear ink composition is equal to or greater than 3% by mass.

4. The recording method according to claim 1, wherein one or more kinds of any of cationic resin, organic acids, and polyvalent metal salts are included as the coagulant included in the processing solution.

5. The recording method according to claim 1, wherein the light ink composition includes a nitrogen-containing solvent.

6. The recording method according to claim 1, wherein a region in which an amount of the adhering clear ink composition is equal to or greater than 1 mg/inch$^2$ is included in a region, to which the processing solution, the light ink composition, and the clear ink composition are caused to adhere, on the recording medium.

7. The recording method according to claim 1, wherein the light ink composition and the dark ink composition respectively include resin, and
    a content of the resin included in the light ink composition and the dark ink composition is equal to or greater than 2% by mass.

8. The recording method according to claim 1, wherein the light ink composition, the dark ink composition, and the clear ink composition are caused to be respectively ejected from the ink jet head and adhere to the recording medium.

9. The recording method according to claim 1, wherein the recording medium is a low-absorbable recording medium or a non-absorbable recording medium.

10. A recording apparatus that performs recording by the recording method according to claim 1.

11. A recording method comprising:
    causing a processing solution that contains a coagulant for coagulating constituents of an ink composition to adhere to a recording medium;
    causing an ink composition that includes a light ink composition and a dark ink composition that belong to a same color system and have mutually different color densities to adhere to the recording medium; and
    causing a clear ink composition that includes resin to adhere to the recording medium,
    wherein the content of polyols with standard boiling points of equal to or greater than 280° C. in the light ink composition, the dark ink composition, and the clear ink composition is equal to or less than 0.8% by mass with respect to the ink composition.

12. An ink set that is used in the recording method according to claim 11, the ink set comprising:
    the ink composition that includes the light ink composition and the dark ink composition; and
    the clear ink composition.

13. The recording method according to claim 11, wherein a content of the resin included in the clear ink composition is equal to or greater than 3% by mass.

14. The recording method according to claim 11, wherein one or more kinds of any of cationic resin, organic acids, and polyvalent metal salts are included as the coagulant included in the processing solution.

15. The recording method according to claim 11, wherein the light ink composition includes a nitrogen-containing solvent.

16. The recording method according to claim 11, wherein a region in which an amount of the adhering clear ink composition is equal to or greater than 1 mg/inch$^2$ is included in a region, to which the processing solution, the light ink composition, and the clear ink composition are caused to adhere, on the recording medium.

17. The recording method according to claim 11, wherein the light ink composition and the dark ink composition respectively include resin, and a content of the resin included in the light ink composition and the dark ink composition is equal to or greater than 2% by mass.

18. The recording method according to claim 11, wherein the light ink composition, the dark ink composition, and the clear ink composition are caused to be respectively ejected from the ink jet head and adhere to the recording medium.

19. The recording method according to claim 11, wherein the recording medium is a low-absorbable recording medium or a non-absorbable recording medium.

20. A recording apparatus that performs recording by the recording method according to claim 11.

21. A recording method comprising:
   causing a processing solution that contains a coagulant for coagulating constituents of an ink composition to adhere to a recording medium;
   causing an ink composition that includes a light ink composition and a dark ink composition that belong to a same color system and have mutually different color densities to adhere to the recording medium; and
   causing a clear ink composition that includes resin to adhere to the recording medium,
   wherein the clear ink composition includes the resin in a form of fine resin particles, and
   a volume average particle diameter after mixing a water dispersion of the fine resin particles with a 0.3M magnesium sulfate aqueous solution is equal to or less than three times as large as a volume average particle diameter before the mixing.

22. The recording method according to claim 21, wherein a content of the resin included in the clear ink composition is equal to or greater than 3% by mass.

23. The recording method according to claim 21, wherein one or more kinds of any of cationic resin, organic acids, and polyvalent metal salts are included as the coagulant included in the processing solution.

24. The recording method according to claim 21, wherein the light ink composition includes a nitrogen-containing solvent.

25. The recording method according to claim 21, wherein a region in which an amount of the adhering clear ink composition is equal to or greater than 1 mg/inch$^2$ is included in a region, to which the processing solution, the light ink composition, and the clear ink composition are caused to adhere, on the recording medium.

26. The recording method according to claim 21, wherein the light ink composition and the dark ink composition respectively include resin, and
   a content of the resin included in the light ink composition and the dark ink composition is equal to or greater than 2% by mass.

27. The recording method according to claim 21, wherein the light ink composition, the dark ink composition, and the clear ink composition are caused to be respectively ejected from the ink jet head and adhere to the recording medium.

28. The recording method according to claim 21, wherein the recording medium is a low-absorbable recording medium or a non-absorbable recording medium.

29. A recording apparatus that performs recording by the recording method according to claim 21.

30. An ink set that is used in the recording method according to claim 21, the ink set comprising:
   the ink composition that includes the light ink composition and the dark ink composition; and
   the clear ink composition.

31. The recording method according to claim 21, wherein a region in which an amount of the adhering light ink composition is equal to or less than 6 mg/inch$^2$ is included in a region, to which the processing solution, the light ink composition, and the clear ink composition are caused to adhere, on the recording medium, and
   a region in which an amount of the adhering dark ink composition is greater than 6 mg/inch$^2$ is included in a region, to which the processing solution and the dark ink composition are caused to adhere.

32. The recording method according to claim 21, wherein the content of polyols with standard boiling points of equal to or greater than 280° C. in the light ink composition, the dark ink composition, and the clear ink composition is equal to or less than 0.8% by mass with respect to the ink composition.

* * * * *